US010592839B2

(12) United States Patent
Behringer et al.

(10) Patent No.: US 10,592,839 B2
(45) Date of Patent: Mar. 17, 2020

(54) EMPLOYING REAL-TIME PERFORMANCE FEEDBACK TO MANAGE RESOURCE COLLECTION

(71) Applicant: Snap! Mobile Inc., Seattle, WA (US)

(72) Inventors: Edward Behringer, Seattle, WA (US); Cole Morgan, Seattle, WA (US); Balin Larson, Seattle, WA (US)

(73) Assignee: SNAP! Mobile LLC, Seattle, WA (US)

( * ) Notice: Subject to any disclaimer, the term of this patent is extended or adjusted under 35 U.S.C. 154(b) by 0 days.

(21) Appl. No.: 15/803,546

(22) Filed: Nov. 3, 2017

(65) Prior Publication Data

US 2019/0138969 A1 May 9, 2019

(51) Int. Cl.
*G06Q 10/06* (2012.01)
*G06Q 30/02* (2012.01)
*H04L 12/24* (2006.01)

(52) U.S. Cl.
CPC ... *G06Q 10/06393* (2013.01); *G06Q 30/0279* (2013.01); *H04L 41/14* (2013.01)

(58) Field of Classification Search
None
See application file for complete search history.

(56) References Cited

U.S. PATENT DOCUMENTS

| | | | |
|---|---|---|---|
| 9,105,054 B2 | 8/2015 | Sobhani et al. | |
| 9,123,073 B2 | 9/2015 | Traina et al. | |
| 9,251,539 B2 | 2/2016 | Imrey et al. | |
| 9,426,291 B1* | 8/2016 | Ouimette | H04M 3/5158 |
| 2002/0178139 A1* | 11/2002 | Chen | G06F 16/283 |
| 2010/0114685 A1* | 5/2010 | Blass | G06Q 20/10 |
| | | | 705/14.16 |
| 2011/0295749 A1* | 12/2011 | Scalisi | G06Q 20/10 |
| | | | 705/44 |

(Continued)

FOREIGN PATENT DOCUMENTS

WO WO-2018237359 A1 * 12/2018 ............. G06Q 40/00

OTHER PUBLICATIONS

Archived Web Site of Snap-Raise.com as captured on Mar. 17, 2016 [retrieved from URL: http://web.archive.org/web/20160317204829/ https://snap-raise.com/].*

(Continued)

*Primary Examiner* — Susanna M. Diaz
(74) *Attorney, Agent, or Firm* — John J. Bamert; Mark P. Walters; Lowe Graham Jones PLLC

(57) ABSTRACT

Embodiments are directed to executing one or more campaigns. Initialization identifiers may be provided to campaign agents associated with campaign owners. The campaign agents may be associated with campaigns based on the initialization identifiers. Resource collection requests may be provided to sources based on source information provided by the campaign agents. Metrics may be provided based on monitoring actions of the sources. Outlier characteristics associated with the resource collection requests may be identified based on a comparison of the metrics to other campaigns. The resource collection requests may be modified based on predicted metrics associated with the outlier characteristics. The modified resource collection requests may be provided to the sources associated with the outlier characteristics. Resources provided from the sources may be distributed to the campaign owners.

29 Claims, 13 Drawing Sheets

(56) References Cited

U.S. PATENT DOCUMENTS

| | | | | |
|---|---|---|---|---|
| 2013/0035975 A1* | 2/2013 | Cavander | ............... | G06Q 30/02 |
| | | | | 705/7.22 |
| 2013/0085803 A1* | 4/2013 | Mauro | ............... | G06Q 30/0201 |
| | | | | 705/7.29 |
| 2014/0207567 A1* | 7/2014 | Gould | ............... | G06Q 30/0246 |
| | | | | 705/14.45 |
| 2014/0310193 A1 | 10/2014 | Olliphant et al. | | |
| 2014/0317012 A1 | 10/2014 | Can et al. | | |
| 2014/0324723 A1 | 10/2014 | Stremler et al. | | |
| 2015/0134556 A1* | 5/2015 | Spinner | .............. | G06Q 30/0279 |
| | | | | 705/329 |
| 2015/0213512 A1* | 7/2015 | Spievak | ............. | G06Q 30/0275 |
| | | | | 705/14.71 |
| 2015/0317670 A1* | 11/2015 | Cavander | ........... | G06Q 30/0242 |
| | | | | 705/14.41 |
| 2015/0348221 A1* | 12/2015 | Pedersen | ................ | G06Q 50/30 |
| | | | | 705/7.38 |
| 2015/0350441 A1* | 12/2015 | Bhamidipati | ....... | H04M 3/5232 |
| | | | | 379/266.01 |
| 2017/0103432 A1* | 4/2017 | Borchetta | .......... | G06Q 30/0269 |

OTHER PUBLICATIONS

Snap-Raise, Home page, website, Mar. 17, 2016, last accessed Oct. 15, 2019, all pages, <https://snap-raise.com> presented through the Internet Archive as <https://web.archive.org/web/20160317204829/https://snap-raise.com>.

* cited by examiner

EMPLOYING REAL-TIME PERFORMANCE FEEDBACK TO MANAGE RESOURCE COLLECTION

TECHNICAL FIELD

The present invention relates generally to executing campaigns, and more particularly, but not exclusively, to executing campaigns to collect resources.

BACKGROUND

Campaigns are frequently executed to collect various resources from candidate sources. Initializing a campaign typically requires significant administrative overhead. Moreover, campaigns to collect resources typically include a single static approach, which is usually a generic resource collection request to all candidate sources of the requested resources. The generic resource request is often a static post to a website that is accessible to all of the candidate sources. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Various Embodiments, which is to be read in association with the accompanying drawings, wherein.

DETAILED DESCRIPTION OF THE VARIOUS EMBODIMENTS

Figure 1:
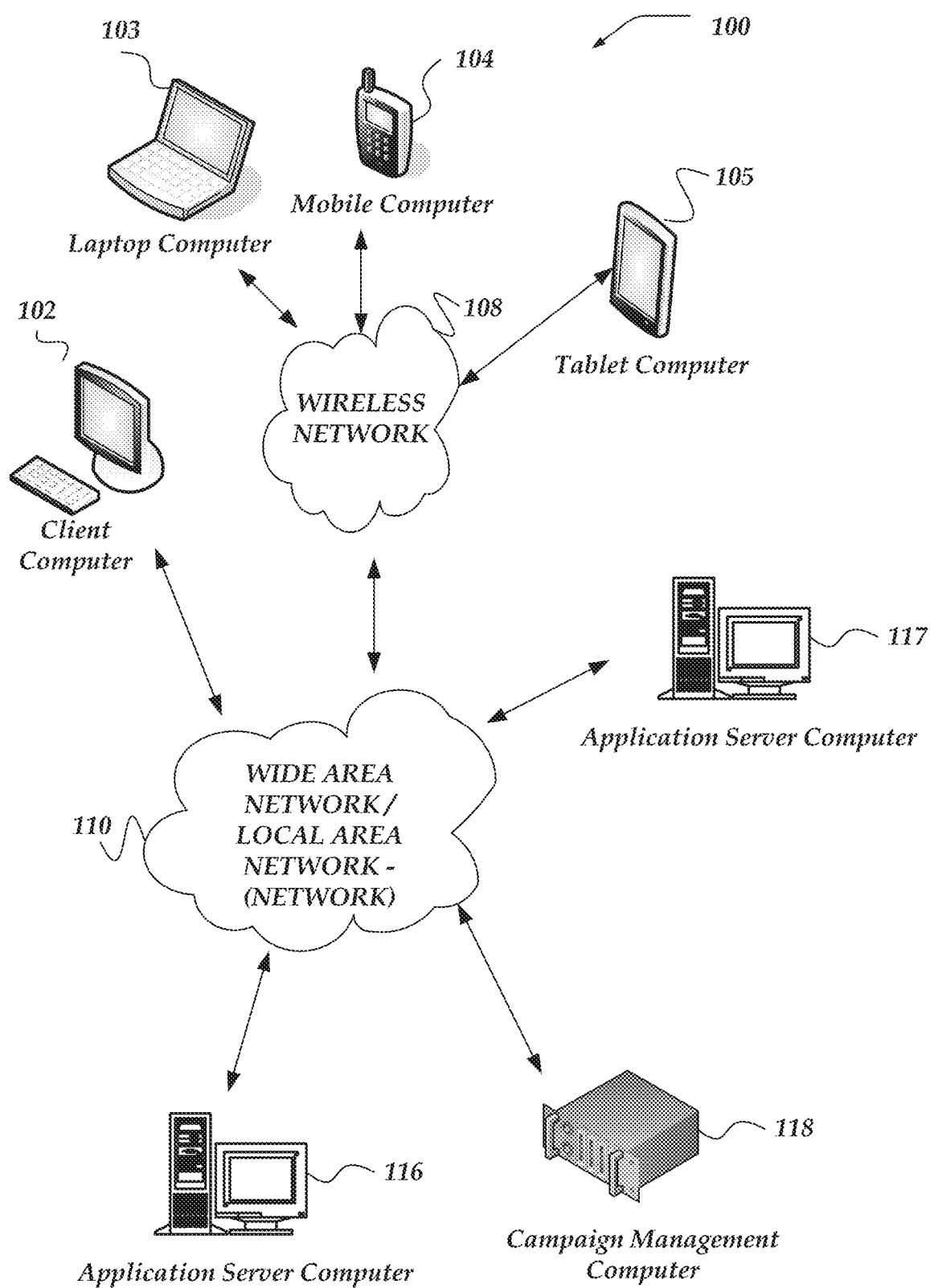
FIG. 1 illustrates a schematic representation of an example system environment in which various embodiments may be implemented.

Various embodiments now will be described more fully hereinafter with reference to the accompanying drawings, which form a part hereof, and which show, by way of illustration, specific example embodiments by which the invention may be practiced. The embodiments may, however, be embodied in many different forms and should not be construed as limited to the embodiments set forth herein; rather, these embodiments are provided so that this disclosure will be thorough and complete and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in one implementation" as used herein does not necessarily refer to the same embodiment or implementation, though it may. Furthermore, the phrase "in another embodiment" or "in another implementation" as used herein does not necessarily refer to a different embodiment or implementation, although it may. Thus, as described below, various embodiments or implementations may be readily combined, without departing from the scope or spirit of the invention.

In addition, as used herein, the term "or" is an inclusive "or" operator and is equivalent to the term "or," unless the context clearly dictates otherwise. The term "based on" is not exclusive and allows for being based on additional factors not described, unless the context clearly dictates otherwise. In addition, throughout the specification, the meaning of "a," "an," and "the" include plural references. Also, throughout the specification, plural references are intended to also disclose the singular, unless the context clearly dictates otherwise. For example, the term "metrics" is employed throughout the specification and is intended to reflect "one or more metrics" because only one metric may be employed or more than one metric may be employed. The meaning of "in" includes "in" and "on." Also, throughout the specification and the claims, the use of "when" and "responsive to" do not imply that associated resultant actions are required to occur immediately or within a particular time period. Instead, they are used herein to indicate actions that may occur or be performed in response to one or more conditions being met, unless the context clearly dictates otherwise. Additionally, throughout the specification, the use of "exemplary" does not imply that other embodiments do not perform as well or are not as worthy of illustration. Instead, the term is used herein to emphasize that each element or function described by the term is an example element or function.

For example embodiments, the following terms are also used herein according to the corresponding meaning, unless the context clearly dictates otherwise.

As used herein, the term "campaign" refers to a multitude of concerted acts that, in combination, achieve a particular objective, such as collecting resources. Examples of campaigns may include solving computational problems, distributing power, file sharing, fundraising, or others.

As used herein, the term "resource" refers to an asset or service that can be distributed, shared, or otherwise provided. Examples of resources may include computation time, storage space, energy, materials, staff, currency, or others.

As used herein, the term "campaign owner" refers to a beneficiary of a campaign. Examples of campaign owners may include one or more computers solving one or more computational problems, network administrators, faculty in one or more academic institutions, club leaders, coaches, or others. In one or more of the various embodiments, a campaign owner may be employed or hosted by one or more entities that may also be beneficiaries of the campaign. Examples of entities may include schools, clubs, or others.

As used herein, the term "campaign agent" refers to a provider of source information (e.g., identification information, contact information, or others) associated with one or more sources.

Examples of campaign agents may include administrators, managers, routers, modems, Domain Name Servers (DNS), students, teachers, athletes, or others.

As used herein, the term "source" refers to a provider of resources. Examples of sources may include one or more candidate or actual sources of resources, such as one or more web services such as Amazon Web Services™ (AWS), seed computers in a peer-to-peer data sharing environment, power plants, electrical substations, power distribution centers (PDCs), motor controllers or motors in one or more motor control centers (MCCs), power supplies, processors, donors, or others that may be candidate or actual suppliers of resources associated with one or more campaigns.

As used herein, the term "campaign monitor" refers to an orchestrator of one or more portions of one or more campaigns. Examples of campaign monitors may include one or more computers orchestrating one or more portions of solving one or more computational problems, network switches, representatives of one or more entities supporting one or more campaigns, or others that may orchestrate various portions of initializing, launching, or executing one or more campaigns or may provide feedback to one or more campaign agents or campaign owners before, during, or after execution of one or more campaigns.

As used herein, the term "outlier characteristics" refers to characteristics of interest, such as outliers, indicators associated with classes, indicators associated with categories, or others. In some embodiments, one or more outlier characteristics associated with a source may include one or more values of one or more responses to one or more prompts, number of mouse clicks, types of clicks, mouse hover time, number of opens, number of visits, number of refreshes, timing of actions, most-recent login time, quantities of actions, magnitude of contributed resources, quantity of resource contributions, or others. For example, one or more machine learning models, linear regression models, heuristics models, or others derived from historical information (e.g., historical metrics) associated with historical campaigns may i) identify one or more classes or clusters of one or more objects or actions (e.g., one or more sources, resource collection requests, or others) associated with the historical campaigns based on values of portions of the historical information, ii) identify one or more characteristics that are indicative of each class or cluster, iii) identify one or more outlier characteristics of one or more objects or actions associated with a current campaign based on a comparison of obtained metrics and the one or more classes (e.g., the identified indicator characteristics or others), and iv) classify the one or more objects or actions based on the one or more outlier characteristics. In some embodiments, one or more configuration files, rules, custom scripts, or others may define outlier characteristics based on obtained metrics. In some embodiments, outlier characteristics such as outliers may be defined based on one or more defined threshold values, conditions, patterns, anomalies, or others associated with one or more metrics.

The following briefly describes example embodiments of the invention in order to provide a basic understanding of some aspects of the invention. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, various embodiments are directed to executing one or more campaigns. In one or more of the various embodiments, one or more initialization identifiers may be provided to one or more campaign agents that are associated with one or more campaign owners. In some of the various embodiments, the one or more campaign agents may be associated with one or more campaigns based on the one or more initialization identifiers. In some embodiments, one or more resource collection requests may be communicated to one or more sources based on source information provided by the one or more campaign agents. In some embodiments, one or more metrics may be provided based on monitoring of one or more actions of the one or more sources. In some embodiments, one or more outlier characteristics associated with the one or more resource collection requests may be identified based on a comparison of the one or more metrics to one or more other campaigns. In some embodiments, the one or more resource collection requests may be modified based on one or more predicted metrics that are associated with the one or more outlier characteristics. In some embodiments, the one or more modified resource collection requests may be provided to the one or more sources associated with the one or more outlier characteristics. In some embodiments, resources provided from the one or more sources may be distributed to the one or more campaign owners.

In one or more of the various embodiments, one or more incentive resources that are associated the one or more campaigns and one or more of the one or more metrics may be provided. In some of the various embodiments, one or more incentive resource selections may be obtained from the one or more campaign agents that are associated with one or more threshold values that correspond to the one or more of the one or more metrics. In some embodiments, the one or more incentive resources may be provided to the one or more campaign agents based on one or more of the one or more thresholds being met or exceeded.

In one or more of the various embodiments, one or more interaction metrics that measure one or more interactions of the one or more sources with instruction information included in the one or more resource collection requests may be collected.

In one or more of the various embodiments, one of the one or more resource collection requests may be associated with one of the one or more campaign agents. In some of the various embodiments, information may be included in the one of one or more resource collection requests that identifies the one of the one or more campaign agents. For example, the included information may include one or more of an email address, name, photograph, or telephone number.

In one or more of the various embodiments, one or more data objects that include the one or more initialization identifiers may be generated. In some of the various embodiments, the one or more data objects may be provided to one or more campaign monitors assigned to the one or more campaigns for distribution to the one or more campaign agents.

In one or more of the various embodiments, access to one or more user-interface components may be provided to the one or more sources. In some of the various embodiments, the one or more user-interface components may be associated with the one or more resource collection requests. In some embodiments, a recommended resource contribution magnitude may be displayed based on the one or more metrics and the one or more predicted metrics.

In one or more of the various embodiments, the source information may be evaluated based on one or more defined rules or patterns. In some of the various embodiments, one or more portions of the source information that corresponds to a previously identified source associated with one or more other campaigns may be evaluated. In some embodiments, one or more portions the source information may be discarded based on one or more results of the evaluations. In some embodiments, additional source information may be obtained to replace some or all of the one or more discarded portions of the source information from the one or more campaign agents.

In one or more of the various embodiments, sequential access to one or more user-interface components may be provided to the one or more campaign agents. In some of the various embodiments, one or more of the one or more campaign agents may be prevented from accessing one or more of the one or more user-interface components until one or more other ones of the one or more campaign agents complete one or more actions associated with one or more other ones of the one or more user-interface components.

Illustrative Operating Environment

FIG. 1 shows components of an example environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Application Server Computer 116, Application Server Computer 117, Campaign Management Computer 118, or others.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or others. In some embodiments, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or others. However, client computers 102-105 are not constrained to these services and may also be employed, for example, for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or others. In some embodiments, client computers 102-105 may include virtually any portable computer capable of connecting to another computer and receiving information, such as laptop computer 103, mobile computer 104, tablet computers 105, or others. However, portable computers may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or others. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive or display graphics, text, multimedia, or others, employing virtually any web-based language. In some embodiments, the browser application is enabled to employ JavaScript, HyperText Markup Language (HTML), eXtensible Markup Language (XML), JavaScript Object Notation (JSON), Cascading Style Sheets (CSS), or others to display or send a message. In some embodiments, a user of the client computer may employ the browser application to perform various activities over a network (online). However, another application may also be used to perform various online activities.

Client computers 102-105 also may include one or more other client applications that are configured to receive or send content between another computer. The client application may include a capability to send or receive content or other information or signals. The client application may further provide information that identifies itself, including a type, capability, name, or others. In some embodiments, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets or other collections of data, sent between other client computers, application server computer 116, application server computer 117, campaign management computer 118, or other computers.

Client computers 102-105 may further be configured to include a client application that enables an end-user to log into an end-user account that may be managed by another computer, such as application server computer 116, application server computer 117, campaign management computer 118, or others. Such an end-user account, in some examples, may be configured to enable the end-user to manage one or more online activities, including in some examples, project management, software development, system administration, configuration management, search activities, social networking activities, browse various websites, communicate with other users, or others. Further, client computers may be arranged to enable users to provide configuration information, or others, to campaign management computer 118. Also, client computers may be arranged to enable users to display reports, interactive user-interfaces, or results provided by campaign management computer 118.

Wireless network 108 is configured to couple client computers 103-105 and its components with network 110. Wireless network 108 may include any of a variety of wireless sub-networks that may further overlay stand-alone ad-hoc networks or others to provide an infrastructure-oriented connection for client computers 103-105. Such sub-networks may include mesh networks, Wireless LANs (WLANs), cellular networks, or others. In one embodiment, the system may include more than one wireless network.

Wireless network 108 may further include an autonomous system of terminals, gateways, routers, or others connected by wireless radio links or others. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G), 5th (5G) generation radio access for cellular systems, WLAN, Wireless Router (WR) mesh, or others. Access technologies such as 2G, 3G, 4G, 5G, and future access networks may enable wide area coverage for mobile computers, such as client computers 103-105 with various degrees of mobility. In some examples, wireless network 108 may enable a radio connection through a radio network access such as Global System for Mobile communication (GSM), General Packet Radio Services (GPRS), Enhanced Data GSM Evolution (EDGE), code division multiple access (CDMA), time division multiple access (TDMA), Wideband Code Division Multiple Access (WCDMA), High Speed Downlink Packet Access (HSDPA), Long Term Evolution (LTE), and others. In essence, wireless network 108 may include virtually any wireless communication mechanism by which information may travel between client computers 103-105 and another computer, network, a cloud-based network, a cloud instance, or others.

Network 110 is configured to couple network computers with other computers, including, application server computer 116, application server computer 117, campaign management computer 118, client computers 102-105 through wireless network 108, or others. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, or other forms of computer-readable media. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including, for example, DS-0, DS-1, DS-2, DS-3, DS-4, OC-3, OC-12, OC-48, or others. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, or other wireless media.

One embodiment of application server computer 116 or application server computer 117 is described in more detail below in conjunction with FIG. 3. Briefly, however, application server computer 116 or application server computer 117 includes virtually any network computer capable of hosting applications or providing services in network environment.

One embodiment of campaign management computer 118 is described in more detail below in conjunction with FIG. 3. Briefly, however, campaign management computer 118 may include virtually any network computer capable of managing one or more campaigns, collecting or analyzing one or more campaign metrics, collecting resources, or distributing resources.

Although FIG. 1 illustrates application server computer 116, application server computer 117, and campaign management computer 118, each as a single computer, the innovations or embodiments are not so limited. For example, one or more functions of application server computer 116, application server computer 117, campaign management computer 118, or others, may be distributed across one or more distinct network computers. Moreover, in one or more embodiments, campaign management computer 118 may be implemented using a plurality of network computers. Further, in one or more of the various embodiments, application server computer 116, application server computer 117, or campaign management computer 118 may be implemented using one or more cloud instances in one or more cloud networks. Accordingly, these innovations and embodiments are not to be construed as being limited to a single environment, and other configurations and other architectures are also envisaged.

Illustrative Client Computer

Figure 2:
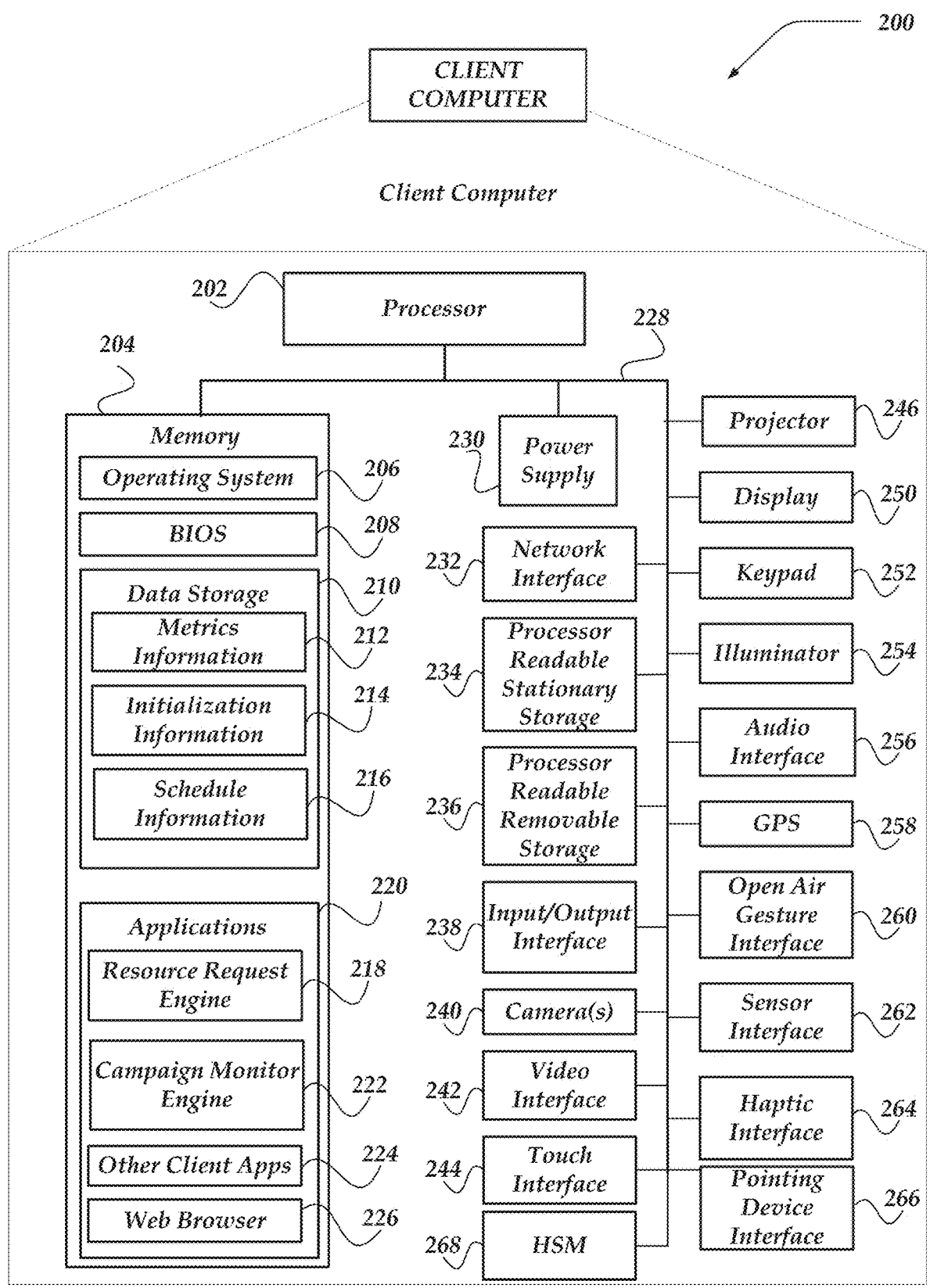
FIG. 2 shows a schematic representation of an example client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver or transceiver 258, open air gesture interface 260, sensor interface 262 (for example, a temperature interface or others), camera(s) 240, projector 246, pointing device interface 266, processor-readable stationary storage device 234, or processor-readable removable storage device 236. Client computer 200 may optionally communicate with a base station (not shown) or directly with another computer. And in some embodiments, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks and is constructed for use with one or more communication protocols and technologies including protocols and technologies that implement any portion of the Open Systems Interconnection model (OSI model), such as global system for mobile communication (GSM), CDMA, time division multiple access (TDMA), UDP, TCP/IP, SMS, MMS, GPRS, WAP, UWB, WiMax, SIP/RTP, EDGE, WCDMA, LTE, UMTS, orthogonal frequency-division multiplexing (OFDM), CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, or others.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or others. For example, video interface 242 may be coupled to a digital video camera, a web-camera, or others. Video interface 242 may comprise a lens, an image sensor, or other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information, such as keys, digital certificates, passwords, passphrases, two-factor authentication information, or others. In some embodiments, hardware security module may be employed to support one or more standard public key infrastructures (PKI) and may be employed to generate, manage, or store keys pairs or others. In some embodiments, HSM 268 may be a stand-alone computer or may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, or others. Input/output interface 238 can utilize one or more technologies, such as Universal Serial Bus (USB), Infrared, Wi-Fi™, WiMax, Bluetooth™, or others.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or others), or others. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Sensor interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or others. Camera 240 may be used to track physical eye movements of a user of client computer 200.

GPS receiver or transceiver 258 can determine the physical coordinates of client computer 200 on the surface of the Earth, which typically outputs a location as latitude and longitude values. GPS receiver or transceiver 258 can also employ other geo-positioning mechanisms, including triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or others, to further determine the physical location of client computer 200 on the surface of the Earth. It is understood that under different conditions, GPS receiver or transceiver 258 can determine a physical location for client computer 200. In one or more embodiments, however, client computer 200 may, through other components, provide other information that may be employed to determine a physical location of the client computer, including, for example, a Media Access Control (MAC) address, IP address, or others.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include audio devices, pointing devices, keypads, displays, cameras, projectors, and others. These peripheral components may communicate over a Pico Network such as Bluetooth™, Zigbee™ and others. Some examples of a client computer with such peripheral human interface components include a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, or others. The client computer's browser application may employ virtually any programming language, including a wireless application protocol (WAP) messages or others. In some embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or others.

Memory 204 may include RAM, ROM, or other types of memory. Memory 204 illustrates an example of computer-readable storage media (devices) for storage of information such as computer-readable instructions, data structures, program modules, or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX or LINUX™ or a specialized client computer communication operating system such as Windows Phone™ or the Symbian® operating system. The operating system may include or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or others. Data storage 210 may also be employed to store social networking information including address books, buddy lists, aliases, user profile information, or others. Data storage 210 may further include program code, data, algorithms, or others, for use by a processor, such as processor 202 to execute and perform actions. In some embodiments, at least some of data storage 210 might also be stored on another component of client computer 200, including non-transitory processor-readable removable storage device 236, processor-readable stationary storage device 234, or even external to the client computer. Data storage 210 may include, for example, metrics information 212, initialization information 214, schedule information 216, or others. Metrics information 212 may include one or more values of one or more metrics associated with one or more active campaigns, completed campaigns, or others or one or more campaign monitors, campaign users, campaign owners, candidate sources, or others. Initialization information 214 may include information for or obtained by initializing one or more campaigns. Schedule information 216 may include information associated with one or more campaign schedules, campaign monitor schedules, campaign user schedules, campaign owner schedules, or others.

Applications 220 may include computer executable instructions which, when executed by client computer 200, transmit, receive, or otherwise process instructions and data. Applications 220 may include, for example, resource request engine 218, campaign monitor engine 222, other client applications 224, web browser 226, or others. Client computers may be arranged to exchange communications, such as queries, searches, messages, notification messages, event messages, alerts, performance metrics, log data, API calls, or others with application servers or network monitoring computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, or others.

Additionally, in one or more embodiments (not shown in the figures), client computer 200 may include one or more embedded logic hardware devices instead of one or more CPUs, such as an Application Specific Integrated Circuits (ASICs), Field Programmable Gate Arrays (FPGAs), Programmable Array Logics (PALs), or others. The one or more embedded logic hardware devices may directly execute embedded logic to perform actions. Also, in one or more embodiments (not shown in the figures), client computer 200 may include one or more hardware microcontrollers instead of one or more CPUs. In some embodiments, the one or more microcontrollers may directly execute their own embedded logic to perform actions and access its own internal memory and its own external Input and Output Interfaces (e.g., hardware pins or wireless transceivers) to perform actions as a System On a Chip (SOC) or others.

Illustrative Network Computer

Figure 3:
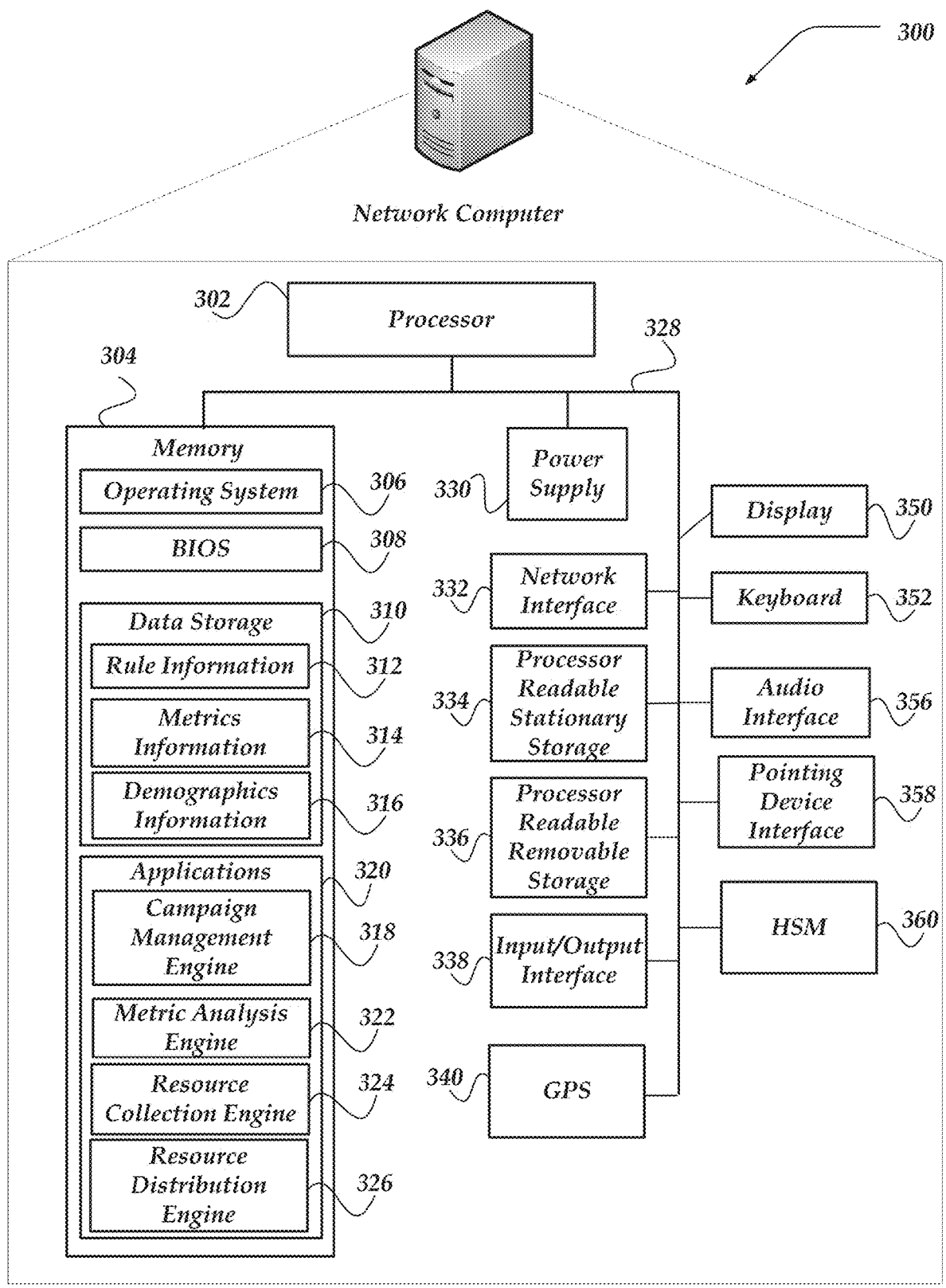
FIG. 3 illustrates a schematic representation of an example network computer.

FIG. 3 shows one example embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of one or more of application server computer 116, application server computer 117, or campaign management computer 118 of FIG. 1.

As shown in the figure, network computer 300 includes a processor 302 that may be in communication with a memory 304 via a bus 328. In some embodiments, processor 302 may be comprised of one or more hardware processors or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, or processor-readable removable storage device 336. Power supply 330 provides power to network computer 300.

Network interface 332 includes circuitry for coupling network computer 300 to one or more networks and is constructed for use with one or more communication protocols and technologies including protocols and technologies that implement any portion of the Open Systems Interconnection model (OSI model), such as global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired or wireless communication protocols. Network interface 332 is sometimes known as a transceiver, transceiving device, or network interface card (NIC). Network computer 300 may optionally communicate with a base station (not shown) or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED), or any other type of light reflective or light transmissive display that can be used with a computer. Display 350 may be a handheld projector or pico projector capable of projecting an image on a wall or another object.

Network computer 300 may also comprise input/output interface 338 for communicating with external devices or computers not shown in FIG. 3. Input/output interface 338 can utilize one or more wired or wireless communication technologies, such as USB™, Firewire™, Wi-Fi™, WiMax, Thunderbolt™, Infrared, Bluetooth™, Zigbee™, serial port, parallel port, or others.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or others), or others. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices, such as mice, styluses, track balls, or others, may communicate through pointing device interface 358 to receive user input.

GPS receiver or transceiver 340 can determine the physical coordinates of network computer 300 on the surface of the Earth, which typically outputs a location as latitude and longitude values. GPS receiver or transceiver 340 can also employ other geo-positioning mechanisms, including triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or others, to further determine the physical location of network computer 300 on the surface of the Earth. It is understood that under different conditions, GPS receiver or transceiver 340 can determine a physical location for network computer 300. In at least one embodiment, however, network computer 300 may, through other components, provide other information that may be employed to determine a physical location of the client computer, including, for example, a Media Access Control (MAC) address, IP address, or others.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX or LINUX™ or a specialized operating system such as Microsoft Corporation's Windows® operating system or the Apple Corporation's IOS® operating system. The operating system may include or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or others. Data storage 310 may also be employed to store social networking information including address books, buddy lists, aliases, user profile information, or others. Data storage 310 may further include program code, data, algorithms, or others, for use by a processor, such as processor 302 to execute and perform actions such as those actions described below. In some embodiments, at least some of data storage 310 might also be stored on another component of network computer 300, including non-transitory media inside processor-readable removable storage device 336, processor-readable stationary storage device 334, or any other computer-readable storage device within network computer 300 or even external to network computer 300. Data storage 310 may include, for example, rule information 312, metrics information, demographics information, 316, or others. Rule information 312 may be a data store that contains one or more rules, filters, or others that may be employed during or after executing one or more campaigns. Metrics information 314 may include one or more values of one or more metrics associated with one or more active campaigns, completed campaigns, or others or one or more campaign monitors, campaign users, campaign owners, candidate sources, or others. In some embodiments, demographics information 316 may include information associated with demographics of one or more geographical regions, campaigns, campaign users, campaign owners, entities that employ or host campaign users or campaign owners, sources, campaign monitors, or the others.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, databases, web services, and so forth. Applications 320 may include campaign management engine 318, metric analysis engine 322, resource collection engine 324, resource distribution engine 326, or others that perform actions further described below. In some of the various embodiments, one or more of the applications may be implemented as modules or components of another application. Further, in some of the various embodiments, applications may be implemented as operating system extensions, modules, plugins, or others.

Furthermore, in some of the various embodiments, campaign management engine 318, metric analysis engine 322, resource collection engine 324, or resource distribution engine 326 may be operative in a cloud-based computing environment. In some of the various embodiments, these engines, or others, that comprise the management platform may be executing within virtual machines or virtual servers that may be managed in a cloud-based based computing environment. In some of the various embodiments, in this context the applications may flow from one physical network computer within the cloud-based environment to another depending on performance and scaling considerations automatically managed by the cloud computing environment. Likewise, in some of the various embodiments, virtual machines or virtual servers dedicated to network campaign management engine 318, metric analysis engine 322, resource collection engine 324, or resource distribution engine 326 may be provisioned and de-commissioned automatically. Also, in some of the various embodiments, campaign management engine 318, metric analysis engine 322, resource collection engine 324, resource distribution engine 326, or others may be located in virtual servers running in a cloud-based computing environment rather than being tied to one or more specific physical network computers. In some embodiments, one or more of campaign management engine 318, metric analysis engine 322, resource collection engine 324, resource distribution engine 326, resource request engine 218, campaign monitor engine 222, or others may individually or cooperatively perform one or more portions of one or more of the actions described herein, such as one or more actions associated with one or more blocks in one or more of the processes described herein. In some embodiments, one or more of the named engines have sub-engines (not shown) that individually or cooperatively perform one or more of the one or more actions. In some embodiments, one or more of the named engines are included as part of another one or more of the named engines.

Further, network computer 300 may also comprise hardware security module (HSM) 360 for providing additional tamper resistant safeguards for generating, storing or using security/cryptographic information, such as keys, digital certificates, passwords, passphrases, two-factor authentication information, or others. In some embodiments, hardware security module may be employed to support one or more standard public key infrastructures (PKI) and may be employed to generate, manage, or store keys pairs, or others. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of one or more CPUs, such as an Application Specific Integrated Circuits (ASICs), Field Programmable Gate Arrays (FPGAs), Programmable Array Logics (PALs), or others. The one or more embedded logic hardware devices may directly execute embedded logic to perform actions. Also, in one or more embodiments (not shown in the figures), network computer 300 may include one or more hardware microcontrollers instead of one or more CPUs. In some embodiments, the one or more microcontrollers may directly execute their own embedded logic to perform actions and access its own internal memory and its own external Input and Output Interfaces (e.g., hardware pins or wireless transceivers) to perform actions as a System On a Chip (SOC) or others.

Illustrative Logical System Architecture

Figure 4:
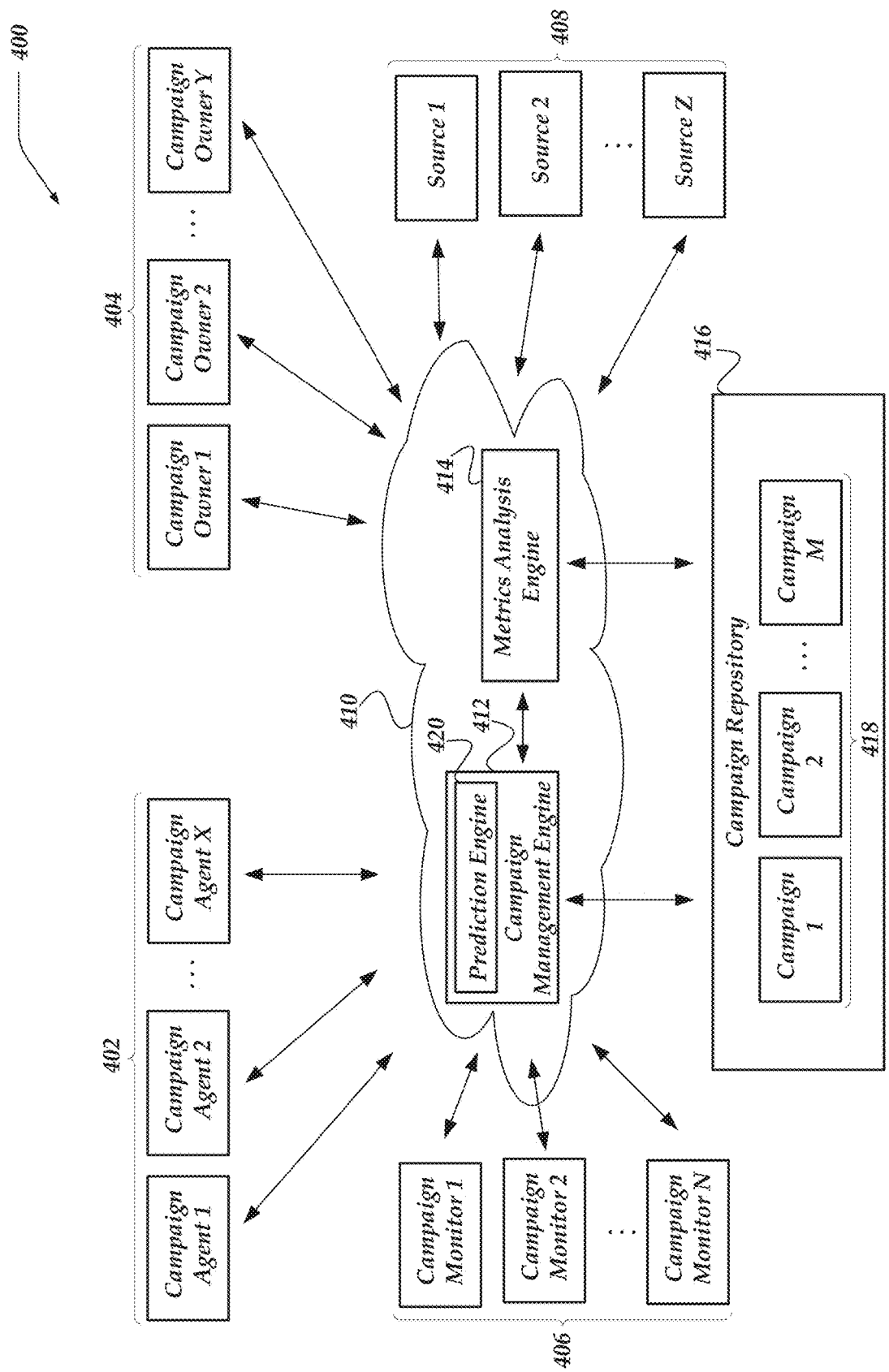
FIG. 4 shows a logical architecture of an example system for executing campaigns.

FIG. 4 shows a logical architecture of example system 400 for executing campaigns. System 400 may be arranged to include one or more campaign agents, campaign owners, campaign monitors, or campaign resources, such as campaign agents 402, campaign owners 404, campaign monitors 406, or sources 408. Each of the one or more campaign agents, campaign owners, campaign monitors, or campaign resources, may include, or be associated with, one or more client computers, such as client computer 200, one or more of client computers 102-105, or others. System 400 may also be arranged to include one or more campaign management computers, such as campaign management computer 410 (represented in the example shown in FIG. 4 as a cloud-computing environment). Each of the one or more campaign management computers may include a network computer, such as network computer 300, application server computer 116, application server computer 117, campaign management computer 118, or others. Campaign management computer 410 may include one or more engines, such as campaign management engine 412 (e.g., campaign management engine 318 or others), metrics analysis engine 414 (e.g., metric analysis engine 322 or others), or others. In some embodiments, one or more prediction engines 420 may be part of or otherwise associated with campaign management engine 412. One or more of the engines in campaign management computer 410 may communicate with one or more campaign repositories, such as campaign repository 416. Each campaign repository may include one or more campaign data stores, such as campaign data stores 418. Each of the one or more campaign data stores may be associated with a campaign, such as an active campaign, a concluded campaign, or an impending campaign. In some embodiments, system 400 may facilitate distributed execution of campaigns to reduce resource consumption by one or more campaign owners, agents, or others during the campaign, at least in comparison to a typical non-distributed campaign.

In one or more of the various embodiments, system 400 may increase efficiency of conducting campaigns by one or more of improving communication between the various components of each campaign (e.g., the one or more campaign owners, campaign agents, campaign monitors, sources, or others), enabling oversight by an objective party, increasing accountability, and others. In some of the various embodiments, when one or more campaign components (e.g., one or more campaign owners, campaign agents, campaign monitors, sources, or others) are offline from one or more networks, one or more sending, forwarding, or other campaign components in system 400 (e.g., one or more campaign management computers 410, campaign monitors 406, campaign owners 404, campaign agents 402, or others) may cache one or more portions of one or more communications intended for the one or more offline campaign components.

In one or more of the various embodiments, the one or more sending, forwarding, or other campaign components may detect that the one or more offline components went offline based on one or more of losing one or more connections to one or more applications, engines, or others in the one or more offline components, failing to obtain a response to one or more communications (e.g., one or more ACK communications or others), or others. In some of the various embodiments, when the one or more campaign components come back online, the one or more rejoining components may notify one or more other campaign components. In some embodiments, the one or more sending, forwarding, or other campaign components may detect the return of the one or more rejoining components based on one or more notifications, reconnections to one or more engines in the one or more rejoining components, responses to one or more prior communications to the one or more rejoining components, or others.

In one or more of the various embodiments, when the one or more campaign components come back online, the one or more sending, forwarding, or other campaign components in system 400 may resynchronize the one or more rejoining campaign components in a synching process. In some of the various embodiments, the synching process may include auditing information in the one or more rejoining components to evaluate one or more states of the one or more rejoining components, whether one or more portions of information in the one or more rejoining components is up to date, or others. In some embodiments, the audit may include obtaining a timestamp associated with a most-recent update of the one or more rejoining components. In some embodiments, the synching process may include evaluating the audited information to produce one or more results that indicate whether one or more states, information, or others in the one or more rejoining components are out of date. In some embodiments, the evaluation may include comparing the timestamp to one or more timestamps associated with a most-recent update provided to one or more other campaign components. In some embodiments, the synching process may include updating information in the one or more rejoining components to reflect updated information associated with the campaign, such as state information associated with the campaign (e.g., the campaign is being initialized, has launched, has concluded, or others) or others.

In one or more of the various embodiments, system 400 may improve communication reliability or coverage by employing one or more failovers. In some of the various embodiments, the one or more failovers may include multiple communication providers that may be dynamically employed based on availability of the one or more other communication providers, such as multiple email providers (e.g., SENDRID, MANDRIL, or others), multiple payment platforms (e.g., WEPAY, STRIPE, or others), or others. In some embodiments, the one or more failovers may include multiple communication modalities that may be dynamically employed based on availability of the one or more other communication modalities, such as two or more of email, SMS (e.g., SMS provided by TOYO or others), user interface (UI) notification, instant message, or others. In some embodiments, one or more configuration files, rules, custom scripts, or others may execute logic (e.g., confirming that no ACK communications were received or others) to prevent duplicate actions when switching providers, modes, or others. In some embodiments, one or more pools of providers or modalities may be provided, and a provider or modality may be selected from the one or more pools based on one or more input conditions, on a rotating basis, or others. Accordingly, system 400 facilitates conducting campaigns over wide geographic regions with varying levels of network reliability or coverage by facilitating employing multi-modal networks and dynamically changing modes of communication from one mode to another based on availability of the communication modes. For example, a campaign monitor may attempt to send a communication to a campaign owner through a campaign monitor engine (e.g., campaign monitor engine 222), and the campaign monitor engine may dynamically select one or more modes of communication, one or more providers, or others based on network availability associated with the one or more modes of communication, one or more providers, or others. In some embodiments, the campaign monitor engine may provide one or more notifications (e.g., a UI notification or others) that the campaign monitor engine is attempting to dynamically select a different mode of communication, provider, or others. In other embodiments, the campaign monitor engine may dynamically select the different mode of communication, provider, or others without further notification.

In one or more of the various embodiments, a campaign owner may provide a request for a campaign to campaign management computer 410. In some of the various embodiments, the request may include campaign initialization information, such as one or more of the following: identification information of the campaign owner; identification information of an entity that employs or hosts the campaign owner or associated campaign agents 402; contact information of the campaign owner; preferred date or time information for an initial campaign event; or others. In some embodiments, the campaign owner may enter the campaign initialization information in one or more fields in a user interface provided by a web page, application, or others. In some embodiments, the user interface may be arranged to provide the entered campaign initialization information to campaign management computer 410 based on one or more actions of the campaign owner, such as selecting a submit button on the web page.

In one or more of the various embodiments, campaign management computer 410 may obtain additional initialization information based on the identification information, such as demographics information associated with the entity, demographics information associated with a geographic region around the entity, or others. In some of the various embodiments, campaign management computer 410 may contact the campaign owner to obtain additional campaign initialization information. In some embodiments, campaign management computer 410 may temporarily assign a campaign monitor to contact the campaign owner to obtain the additional campaign initialization information. In some embodiments, campaign management computer 410 may provide one or more portions of the initialization information to the temporary campaign monitor to facilitate the temporary campaign monitor contacting the campaign owner. In other embodiments, the user interface may be arranged to collect each portion of the campaign initialization information to facilitate starting initialization of a campaign directly from the user interface.

In one or more of the various embodiments, campaign management computer 410 may assign the campaign monitor or another campaign monitor to the requested campaign arbitrarily or based on the initialization information, such as one or more portions of the campaign initialization information, demographics information (e.g., census information, information obtained in prior or concurrent campaigns, or others), or others. For example, each campaign monitor 406 may be associated with a logical territory (e.g., type of activity associated with the requested campaign, entity, campaign owner, or campaign agents), geographical territory (e.g., zip codes or others), or others and may be assigned campaigns for entities or campaign owners 404 associated with the campaign monitor's logical or geographic territory.

In one or more of the various embodiments, multiple campaign monitors 406 may be associated with the same territory. In some of the various embodiments, campaign management computer 410 may evaluate the multiple campaign monitors based on one or more portions of the initialization information to select a campaign monitor to assign to the requested campaign. In some embodiments, campaign management computer 410 may evaluate the multiple campaign monitors to provide results (e.g., scores or others) that identify the campaign monitor with the most experience or knowledge associated with one or more characteristics of the requested campaign, the most seniority, the most scheduling availability, the highest performance ratings overall, the highest performance ratings over a selected time window, or others. In some embodiments, campaign management computer 410 may assign a campaign monitor to the requested campaign based on the results of the evaluation. In some embodiments, campaign management computer 410 may notify the assigned campaign monitor of the assignment with a push notification or others.

In one or more of the various embodiments, campaign management computer 410 may schedule one or more events (e.g., communications or others) between the campaign monitor and the campaign owner based on one or more portions of the initialization information or campaign information associated with the campaign monitor, such as schedule availability information or others. In some of the various embodiments, a given time window may be considered unavailable if the initialization information or campaign information actually conflicts or conflicts when evaluated based on additional availability information, such as actual or predicted traffic, actual or predicted geo locations (e.g., geofencing or others), or others. For example, back-to-back events may be precluded from being scheduled when the event locations are geographically separated from each other by multiple miles yet may be permissible when the event locations are at the same location (e.g., two events at the same school or others). In some embodiments, campaign management computer 410 may provide the initialization information, campaign information, or additional availability information to the temporary campaign monitor, and the temporary campaign monitor may schedule the one or more events based on the provided information. In some embodiments, the campaign monitor may accept, reject, or modify the schedule associated with the one or more events. In some embodiments, one or more events may be scheduled based on the scheduling of one or more milestone events (e.g., a first communication between the campaign monitor and the campaign owner, first physical contact between the campaign monitor and the campaign owner, start date for the campaign, or others) at a time or date that precedes or follows the one or more milestone events by one or more predetermined numbers of days or amounts of time.

In one or more of the various embodiments, campaign management computer 410 may generate one or more campaign identifiers uniquely associated with the requested campaign arbitrarily, sequentially for requested campaigns, based on the initialization information, or others. In some of the various embodiments, campaign management computer 410 may generate one or more initialization identifiers associated with the one or more campaign identifiers. In some embodiments, campaign management computer 410 may generate one or more initialization identifiers for campaign owners 404 associated with the requested campaign and one or more other initialization identifiers for campaign agents 402. In some embodiments, campaign management computer 410 may populate one or more data objects (e.g., one or more records, files, or others) with the one or more initialization identifiers associated with the one or more campaign owners or may populate one or more data objects with the one or more initialization identifiers associated with the one or more campaign owners. In some embodiments, campaign management computer 410 may provide the one or more data objects to the campaign monitor for distribution to the one or more campaign owners or campaign agents associated with the campaign.

In one or more of the various embodiments, the requested campaign may be initialized based on one or more of the initialization information, the one or more initialization identifiers, or others. In some of the various embodiments, each campaign owner or campaign agent may install, load, open, or otherwise initialize a campaign initialization engine (e.g., one or more engines included in applications 220 or others) based on one or more instructions from the campaign monitor, such as the distributed one or more data objects or others. In some embodiments, the campaign initialization information may identify the one or more campaign owners or agents as being campaign owners 404 or campaign agents 402 based on one or more portions of initialization information input or otherwise provided to the campaign initialization information, such as the one or more initialization identifiers. In some embodiments, the campaign initialization engine may permit the one or more campaign owners or agents to proceed through one or more steps in the campaign initialization in stages. In some embodiments, the campaign initialization engine may provide one or more different views based on one or more roles associated with the initialization information, such as an administrative view to one or more campaign monitors or owners, a subordinate view to one or more campaign agents, or others. In some embodiments, the campaign initialization engine may provide different content based on the one or more roles associated with the initialization information.

In one or more of the various embodiments, the campaign initialization engine may prevent the one or more campaign owners or agents from proceeding to a subsequent stage until obtaining one or more instructions from the campaign monitor. In some of the various embodiments, the campaign monitor may install, load, open, or otherwise initialize a campaign monitor engine (e.g., campaign monitor engine 222 or others) that obtains progress information from the campaign initialization engine for each of the one or more campaign owners or agents. In some embodiments, the campaign monitor engine may provide the one or more instructions to the campaign initialization engine associated with each of the one or more campaign owners or agents based on one or more indications (e.g., evaluation of the progress information, user input, or others) that each of the one or more campaign owners or agents has successfully completed the present stage. In other embodiments, the campaign initialization engine or campaign management computer 410 may monitor the progress information and controls the ability of the one or more campaign owners or agents to proceed through the campaign initialization.

In one or more of the various embodiments, one or more stages in the campaign initialization may include providing source information, such as identification information, contact information, or other information associated with one or more candidate sources, such as sources 408. In some of the various embodiments, campaign management computer 410 may evaluate the quality of the source information. In some embodiments, the quality may be evaluated by verifying that the source information adheres to one or more rules, does not include duplicates, has not failed to produce results or metrics when used in the past, or others. In some embodiments, campaign management computer 410 may notify the campaign monitor engine or the campaign initialization engine that source information having quality below a threshold is invalid or must be replaced to proceed to the next stage. For example, when a campaign agent provides contact information (e.g., identification information, email address, IP address, phone numbers, or others) for candidate source identification information, campaign management computer 410 may provide a notification that the contact information is invalid if a query to one or more databases provides a result that indicates that one or more portions of the contact information has been previously used in the same or another campaign without the candidate source interacting with a corresponding request.

In one or more of the various embodiments, the campaign monitor or the campaign initialization engine may notify each of the one or more campaign owners or agents of one or more campaign goals (e.g., quantity of candidate sources, amount of resources collected, or others) associated with the campaign owner or agents. In some of the various embodiments, one or more stages in the campaign initialization may include selecting one or more rewards associated with one or more goals. In some embodiments, each campaign agents 402 may select one or more rewards from one or more pools of candidate rewards associated with one or more tiers of goals. In some embodiments, the one or more pools of candidate rewards may be dynamically generated based on feedback information from one or more distributors, warehouses, or others. In other embodiments, the one or more pools of candidate rewards may be dynamically generated based on one or more characteristics of the campaign, one or more campaign owners, entity that hosts or employs the one or more campaign owners, one or more campaign agents, type of activity to consume the resources collected in the campaign, or others. In some embodiments, one or more magnitudes of contributed resources, quantities of resource contributions, or others for previous campaigns may be evaluated based on the one or more candidate or selected rewards included in the one or more pools associated with the previous campaigns, such as with one or more machine learning models, linear regression models, heuristics models, or others, to dynamically generate the one or more pools of resources based on the one or more results. Accordingly, in some embodiments, each campaign agent 402 may obtain the one or more selected rewards associated with each tier of goals when the campaign agent achieves the goal associated with the tier. Examples of the rewards may include resources, such as a portion of the resources associated with the campaign or others. In some embodiments, the rewards may be selected based on the application of one or more rule-based policies, configuration information, user-input, or others.

Figure 7:
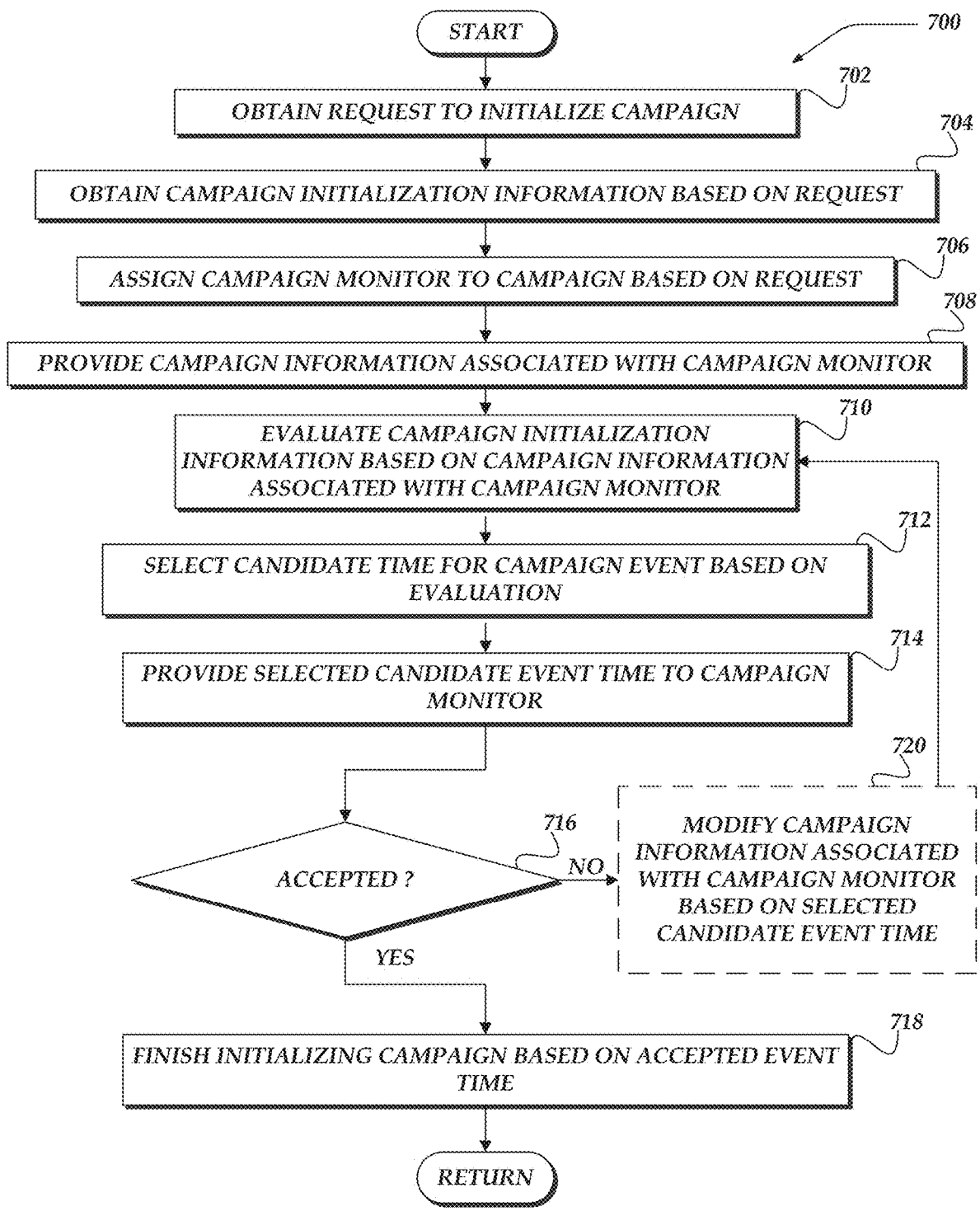
FIG. 7 illustrates a logical flow diagram of an example process for initializing campaigns.
Figure 8:
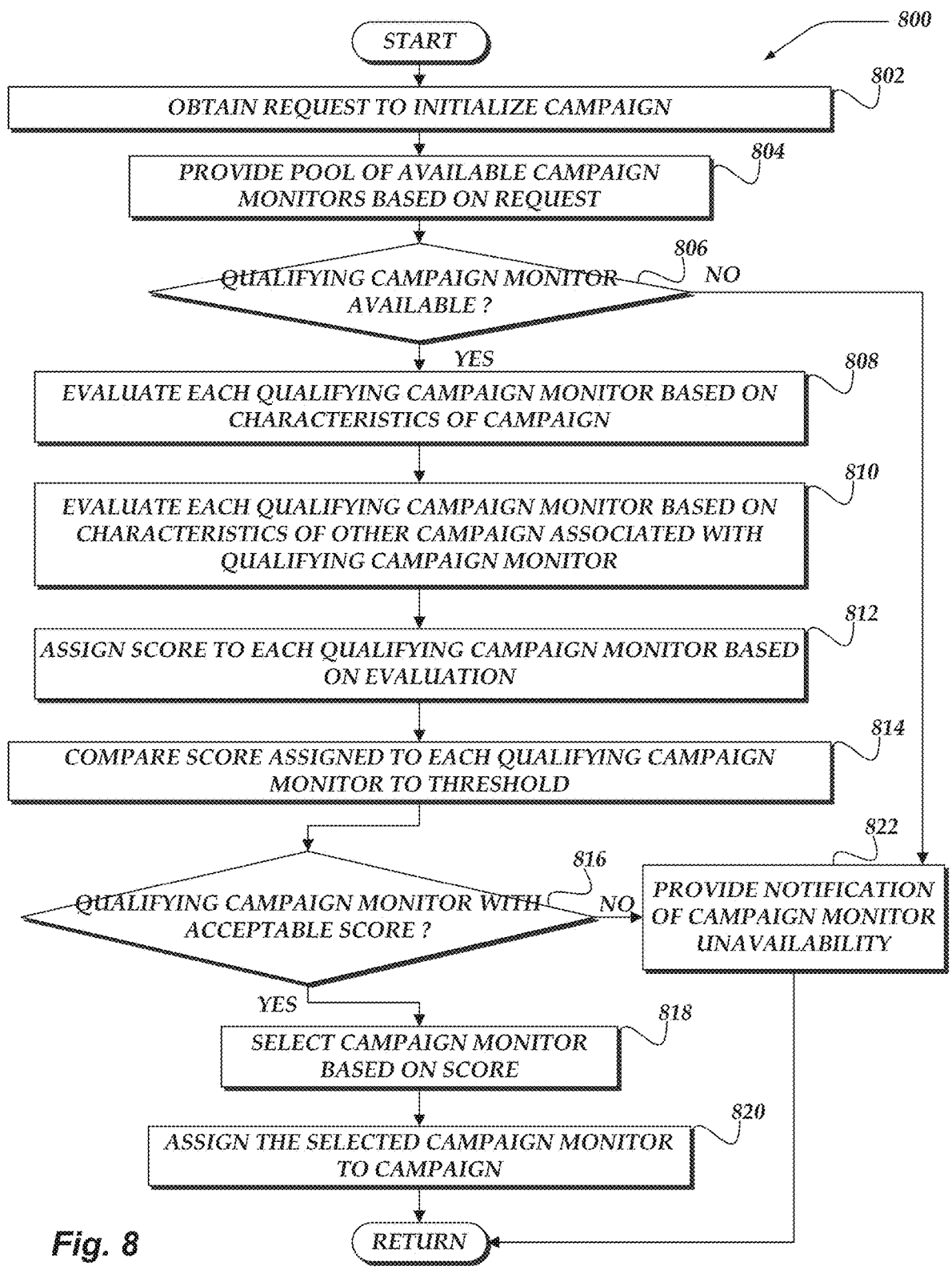
FIG. 8 shows a logical flowchart of an example process for assigning network monitors to campaigns.
Figure 9:
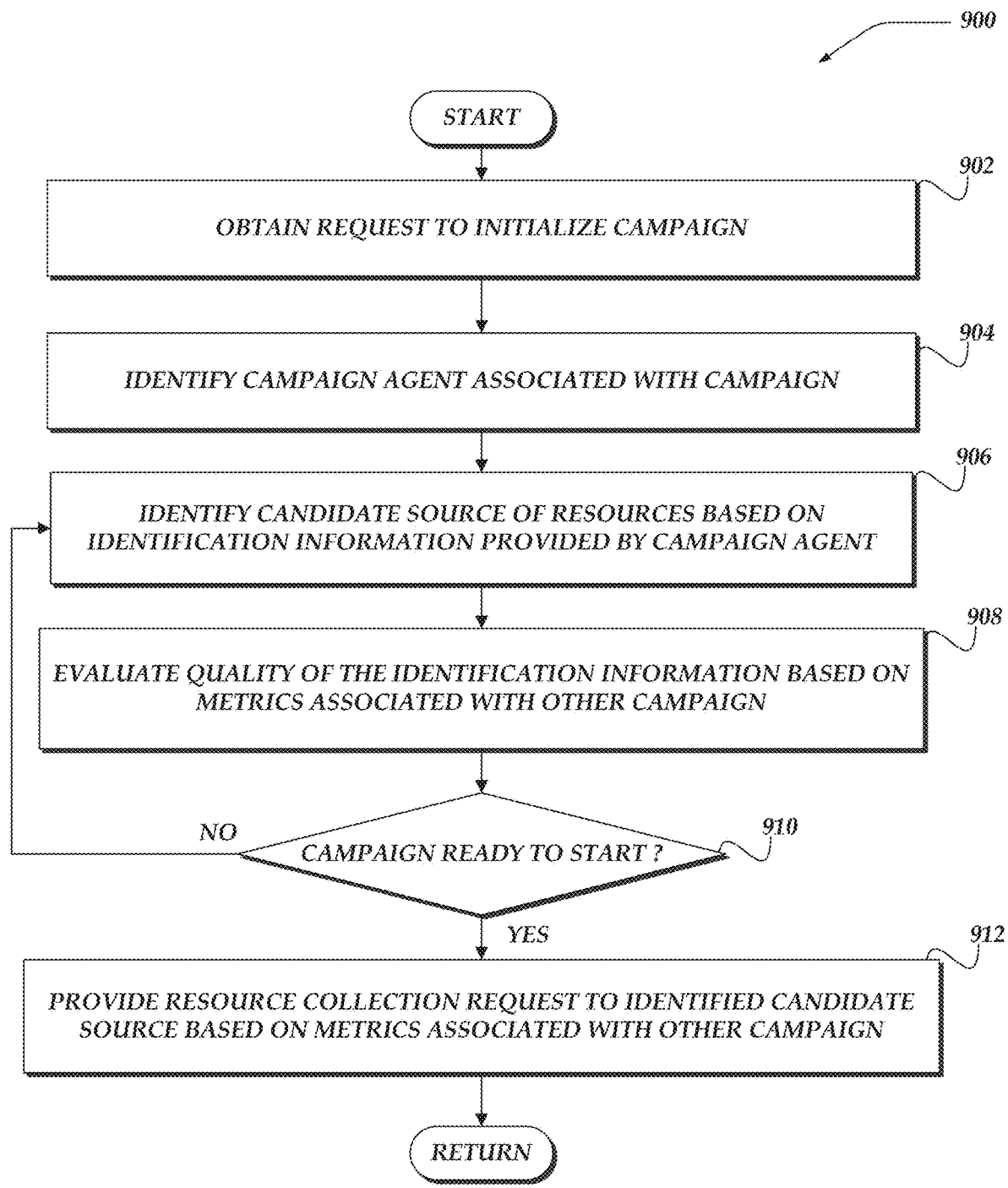
FIG. 9 illustrates a logical flow diagram of an example process for launching campaigns.

In one or more of the various embodiments, initialization metrics associated with each action involved in or associated with each initialization process, the campaign initialization engine, each launching process, or others may be obtained, such as one or more metrics based on one or more actions of one or more campaign owners, monitors, agents, or others during one or more portions of each initialization process (e.g., one or more portions of one or more blocks in one or more of processes 700 or 800 of FIG. 7 or 8 or others), interaction with the campaign initialization engine, each launching process (e.g., one or more portions of one or more blocks in process 900 of FIG. 9 or others), or others. In some embodiments, the initialization metrics may include one or more responses to one or more prompts, mouse clicks, types of clicks, mouse hover time, opens, visits, refreshes, timing of actions, most-recent login time, quantities of actions, or others. In some of the various embodiments, the initialization metrics may be evaluated to increase the efficiency of the initiation or launching processes or one or more actions involving the campaign initialization engine.

In one or more of the various embodiments, the selection, composition, or other characteristics of the initiation or launching processes or one or more actions involving the campaign initialization engine may be based on one or more machine learning models, linear regression models, heuristics models, or others derived from relevant historical metrics for one or more other campaigns. In some of the various embodiments, such information may include information associated with one or more other campaign owners, entities, campaign agents, campaign monitors, geographical or logical territories, sources, others having similar demographics information, or others having one or more characteristics that correspond to one or more characteristics of the campaign, campaign owner, entity, one or more campaign agents, campaign monitor, campaign management computer, geographical or logical territory, or others. The one or more machine learning models, linear regression models, heuristic models, or others may be employed to discover one or more candidate modifications to the initialization process that are predicted to reduce initialization actions (e.g., communications, clicks, or others), such as based on one or more predictions discovered by prediction engine 420. In other embodiments, one or more machine learning models, linear regression models, heuristics models, or others may be applied to historical metrics for one or more other campaigns associated with one or more data objects of one or more of the campaign owner, entity, one or more campaign agents, campaign monitor, campaign management computer, one or more sources, or others to provide one or more portions of the discoveries. In some embodiments, a deep-learning artificial neural network may be trained using historical information to classify or identify one or more features of the initiation or launching processes or one or more actions involving the campaign initialization engine that are predicted to have increased success rates (e.g., decreased initialization or launch time consumptions or others), such as based on one or more predictions discovered by prediction engine 420.

For example, the discoveries may indicate that the initialization process is significantly prolonged because one or two campaign agents typically get hung up in a particular stage, so, in some embodiments, the other campaign agents may be permitted to proceed at the typical hang-up position while the campaign monitor provides further attention to the one or two hung campaign agents. As another example, the discoveries may indicate that modifying one or more interfaces (e.g., user interfaces (UIs) or others) to have one or more additional, fewer, alternative, or differently positioned interface components (e.g., one or more check boxes, radio buttons, text fields, or others), one or more modified portions of content, different timing, or others may improve the efficiency of the initialization or launching process. Accordingly, in some of the various embodiments, one or more characteristics of the campaign initialization engine may be modified based on evaluation of the one or more initialization metrics.

In one or more of the various embodiments, campaign management computer 410 may provide one or more resource collection requests to one or more identified candidate sources based on the source information. In some of the various embodiments, each request to one or more sources 408 may include one or more portions of information that identify the campaign, the campaign agent or owner that provided the source information associated with the one or more sources, or others. In some embodiments, each request may include instruction information to provide resources to the campaign. In some embodiments, the instruction information may include one or more telephone numbers, email addresses, SMS short-codes, one or more Uniform Resource Identifiers (URIs), such as one or more Uniform Resource Locators (URLs) (e.g., one or more tracking URLs or others) or others that identify one or more system mechanisms or components (e.g., one or more web pages or others) that facilitate providing resources from sources for the campaign. In some embodiments, the one or more system components may include visibly apparent resource collection information (e.g., resource collection information that is visible to an unaided human eye) that suggests one or more amounts or quantities of resources to provide based on obtained metrics. In some embodiments, the one or more suggested amounts or quantities may include a minimum accepted contribution, an average contribution for the campaign, an average contribution for campaigns in a logical or geographical territory associated with the campaign, a greatest contribution for the campaign, the most recent amount of resources contributed by the one or more sources, or others. In some embodiments, the suggested amounts or quantities may be selected based on a comparison of one or more candidate suggested amounts or quantities, such as a greater of the average contribution for the campaign, the average contribution campaigns in the logical or geographical territory associated with the campaign, values predicted using machine learning models, or others (e.g., one or more predictions discovered by prediction engine 420). In some embodiments, one or more fields may be automatically populated with the selected amounts or quantities.

In one or more of the various embodiments, campaign management computer 410 may obtain metrics associated with the instruction information that was provided to the one or more identified candidate sources. In some of the various embodiments, instruction information for each source 408 may have one or more unique identifiers associated with one or more of the source, the campaign agent that provided the information associated with the source, the instruction information itself, or others. In some embodiments, each interaction with the instruction information may be reported to campaign management computer 410, and campaign management computer 410 may obtain metrics information associated with each interaction, such as date, time of day, frequency, duration, type, application used by the source to view the instruction information, user-interface interaction (e.g., mouse clicks, types of clicks, mouse hover time, opens, visits, refreshes, timing of actions, most-recent login time, quantities of actions, or others), delay between providing the request and the interaction, or others.

In one or more of the various embodiments, when a source provides information to the one or more system components to provide resources to the campaign, the one or more system components may provide the information to one or more resource collection engines (e.g., resource collection engine 324 or others). In some of the various embodiments, the resource collection engine may collect the identified resources from the source, may store the collected resources in one or more storage spaces (e.g., one or more batteries, tanks, ledgers, or others), and may provide campaign management computer 410 with one or more tokens that indicate that the resources have been collected from the source. In other embodiments, the resource collection engine may provide the collected resources to campaign management computer 410 or others for storage or use. In some embodiments, one or more identifiers may be generated each time that the one or more system components are initialized, and the one or more identifiers may be included with the communication to the one or more resource collection engines to prevent duplicate resource collections. For example, the one or more system components may submit a communication to the one or more resource collection engines multiple times because the submission seems to have failed, and, if the one or more resource collection engines obtains the multiple submissions, the one or more resource collection engines may recognize that one or more of the submissions are duplicates based on the multiple submissions having the same one or more identifiers. In some embodiments, the resource collection engine may be operated by a third party to protect sensitive information (e.g., social security numbers or others) that may be exposed by the one or more system components.

In one or more of the various embodiments, campaign management computer 410 may facilitate returning resources to sources 408 based on one or more requests from sources 408, collecting excess resources, or others. In some of the various embodiments, campaign management computer 410 may provide the return resources to the resource collection engine for distribution back to one or more sources 408, may instruct the resource collection engine to return stored resources, or may return stored resources to one or more sources 408.

In one or more of the various embodiments, campaign management computer 410 may generate one or more data objects for one or more campaign agents 402, campaign owners 404, campaign monitors 406, sources 408, or campaigns. In some embodiments, campaign management computer 410 may generate one or more data objects for each communication communicated from one or more components of system 400 over one or more networks to one or more other components of system 400. In some of the various embodiments, the one or more data objects may conform to one or more data models. For example, a data object for campaign agent number two may conform to a data model for campaign agents 402, a data object for campaign owner number two may conform to a data model for campaign owners 404, a data object for campaign monitor number two may conform to a data model for campaign monitors 406, a data object for source number two may conform to a data model for sources 408, or a data object for campaign number two may conform to a data model for campaigns 418.

In one or more of the various embodiments, campaign agents 402 may be rewarded, encouraged, or others based on obtained metrics. In some of the various embodiments, metrics analysis engine 414 may evaluate metrics associated with one or more campaign agents 402 to produce one or more results that indicate the performance of the one or more campaign agents, such as actual performance, performance relative to one or more thresholds, performance relative to one or more other campaign agents 402, or others. In some embodiments, campaign management computer 410 may generate one or more work orders to provide one or more campaign agents 402 one or more rewards based on the performance results indicating that the one or more campaign agents met or exceeded one or more goals. In some embodiments, the one or more work orders may be provided to one or more reward sources (not shown) (e.g., one or more data stores, warehouses, distribution centers, or others) to provide the one or more rewards to one or more campaign agents 402.

In one or more of the various embodiments, the rewards may be distributed throughout the campaign such as when goals are met, distributed when the campaign concludes, or others. In some of the various embodiments, one or more purchase orders, manufacture orders, delivery orders, or others associated with one or more earned rewards may be predictively placed or updated based on evaluation of one or more metrics associated with the campaign or one or more campaign agents 402 (e.g., one or more predictions discovered by prediction engine 420). In some embodiments, the selection, composition, placement, or updating of one or more purchase orders, manufacture orders, delivery orders, or others associated with one or more earned rewards may be based on one or more machine learning models, linear regression models, heuristics models, or others derived from historical metrics for one or more other campaigns. In some embodiments, such information may include information associated with one or more other campaign owners, entities, campaign agents, campaign monitors, geographical or logical territories, sources, others having similar demographics information, or others having one or more characteristics that correspond to one or more characteristics of the campaign, campaign owner, entity, one or more campaign agents, campaign monitor, campaign management computer, geographical or logical territory, or others. The one or more machine learning models, linear regression models, heuristic models, or others may be employed to discover one or more times, events, or others at which one or more campaign agents 402 are predicted to reach one or more goals associated with one or more selected rewards (e.g., one or more predictions discovered by prediction engine 420). In other embodiments, one or more machine learning models, linear regression models, heuristics models, or others may be applied to historical metrics for one or more other campaigns associated with one or more data objects of one or more of the campaign owner, entity, one or more campaign agents, campaign monitor, campaign management computer, one or more sources, or others to provide one or more portions of the discoveries. In some embodiments, one or more purchase orders, manufacture orders, delivery orders, or others associated with one or more earned rewards may be predictively placed or updated based on the discoveries (e.g., one or more predictions discovered by prediction engine 420). For example, in some embodiments, a deep-learning artificial neural network may be trained using historical information to classify or identify the selection, composition, placement, or updating of one or more purchase orders, manufacture orders, delivery orders, or others associated with one or more earned rewards that are predicted to have increased success rates (e.g., orders placed on time, with accurate quantities, at off-peak processing hours, or others) (e.g., one or more predictions discovered by prediction engine 420).

In one or more of the various embodiments, the campaign monitor may provide one or more encouragement communications to one or more campaign agents 402 or campaign owners 404 based on the performance results indicating that the one or more campaign agents are underperforming relative to one or more thresholds or one or more other campaign agents 402. In some of the various embodiments, the campaign monitor engine (e.g., campaign monitor engine 222 or others) may suggest one or more messages based on the performance results and may provide one or more indicators to the campaign management computer 410 based on the performance communications provided by the campaign monitor. In some embodiments, one or more of the communications may be automatically provided based on the metrics. In other embodiments, one or more campaign owners 404 may be provided access to one or more dashboards associated with the one or more campaigns 418. In some embodiments, the one or more dashboards may traverse one or more models to convert one or more data objects to one or more visual representations (e.g., one or more color-coded banners or others) that represent numbers of communications made to one or more sources 408, quality of interactions by the one or more sources (e.g., clicks, opens, quantities of resource contributions, magnitude of contributed resources, or others) to facilitate one or more campaign owners 402 quickly understanding one or more statuses associated with the campaign, providing directed encouragement to one or more campaign agents 402, or others.

In one or more of the various embodiments, sources 408 may be retargeted based on obtained metrics. In some of the various embodiments, sources 408 may be retargeted based on a failure to contribute resources. In other embodiments, sources 408 may be retargeted regardless of prior contributions. In some embodiments, metrics analysis engine 414 may evaluate metrics associated with one or more sources 408 to select one or more retargeting strategies or tactics based on outlier characteristics associated with one or more sources 408. In some embodiments, one or more resource collection requests may be selected for employment in the retargeting process by default and may be replaced or otherwise modified if analysis of the obtained metrics associated with one or more sources include one or more outliers (e.g., one or more outliers relevant to the one or more sources in the same campaign, relevant to one or more sources in one or more other campaigns, or others) based on one or more evaluations of the metrics. In some embodiments, the one or more outlier resource collection requests may be replaced or modified if one or more other resource collection requests or resource collection request characteristics are predicted to provide improved results (e.g., greater magnitude of contributed resources, greater quantity of resource contributions, or others) based on one or more predictions discovered by prediction engine 420.

In one or more of the various embodiments, metrics analysis engine 414 may classify or categorize the one or more evaluated sources 408 based on evaluation of one or more data objects associated with the one or more evaluated sources 408. In some of the various embodiments, metrics analysis engine 414 may select one or more retargeting strategies or tactics employed with one or more sources 408 in the same class or category that subsequently contributed resources and may apply the one or more selected retargeting strategies or tactics when retargeting the one or more classified or categorized sources. In some embodiments, the one or more system components may be modified based on the obtained metrics. For example, the one or more system components may be modified to employ one or more interface components (e.g., one or more check boxes, radio buttons, text fields, or others) based on evaluation of the obtained metrics indicating that one or more sources 408 contribute more resources when the one or more system components employs the one or more interface components than when the one or more system components employs one or more other interface components. In some embodiments, timing of the one or more resource collection requests may be modified based on the obtained metrics. For example, when retargeting one or more sources 408, the one or more resource collection requests may be provided when an actual or derived location of the one or more sources has cloudy, cold, or rainy weather based on the obtained metrics including location information (e.g., included in the source information, derived from GPS information, derived from IP address information, or others) associated with the one or more sources, correlating the location information with weather information, and the evaluation of the metrics indicating that sources 408 tend to provide more resources in cloudy, cold, or rainy weather (e.g., fewer outdoor activities may be available to sources 408 in cloudy, cold, or rainy weather).

In one or more of the various embodiments, campaign monitors 406 may be rewarded, encouraged, or others based on obtained metrics. In some of the various embodiments, metrics analysis engine 414 may evaluate metrics associated with one or more campaign monitors 406 to produce one or more results that indicate the performance of the one or more campaign monitors, such as actual performance, performance relative to one or more thresholds, performance relative to one or more other campaign monitors 406, performance relative to a campaign monitor's historical performance over one or more moving windows (e.g., 14 day window, one month window, quarter-year window, half-year window, year window, two-year window, or others), or others. In some embodiments, one or more campaign monitors 406 may supervise or manage one or more subordinate campaign monitors 406 and may be evaluated based on evaluation of the performance of the one or more subordinate campaign monitors, such as evaluation of one or more changes in the subordinate campaign monitors' performance since the one or more campaign owners began to supervise or manage the one or more subordinate campaign monitors or others. In some embodiments, campaign management computer 410 may provide resources to or withhold resources from one or more campaign monitors 406 based on the performance of the one or more campaign monitors.

In one or more of the various embodiments, campaign management computer 410 may distribute the collected resources to the one or more campaign owners or entities as the resources are collected, at conclusion of the campaign, or others. In some of the various embodiments, campaign management computer 410 may provide a subset of the collected resources to the one or more campaign owners or entities based on consumption information. In some embodiments, one or more portions of the collected resources may be consumed during the campaign, such as heat due to impedance, inefficiencies, storage costs, expenses, or others. In some embodiments, campaign management computer 410 may estimate the consumption information during the campaign to provide one or more running estimates of the collected resources to be provided to the one or more campaign owners or entities. In some embodiments, campaign management computer 410 may make a final calculation of the consumption information when the campaign is completed.

In one or more of the various embodiments, one or more recurring administrative tasks may be performed based on executing one or more configuration files, rules, custom scripts, or others at scheduled times, at occurrence of predetermined events, or when one or more input conditions are met to facilitate reducing computational resource consumption during peak resource consumption times or events. In some of the various embodiments, the one or more recurring administrative tasks may include reminder communications (e.g., SMS messages, emails, instant messages, or others), activating one or more campaigns (e.g., generating one or more campaign data objects or others), deactivating one or more campaigns (e.g., moving one or more campaign data objects to other storage locations, deleting cached information associated with the one or more deactivated campaigns, or others), settling transactions associated with one or more completed campaigns (e.g., updating one or more campaign statuses, fulfilling or placing one or more reward orders, distributing resources, or others), or others.

In one or more of the various embodiments, the client computers, campaign agents 402, campaign owners 404, campaign monitors 406, or sources 408 may have vertical access to authorized information in one or more campaign data stores 418, thereby permitting access to authorized information in one or more campaign data stores 418 associated with the one or more campaigns that are associated with the client computers, campaign agents 402, campaign owners 404, campaign monitors 406, or sources 408. In some example embodiments, the client computers, campaign agents 402, campaign owners 404, campaign monitors 406, or sources 408 may lack horizontal access, thereby precluding access to information in one or more campaign data stores 418 associated with the one or more campaigns that are not associated with the client computers, campaign agents 402, campaign owners 404, campaign monitors 406, or sources 408. Accordingly, campaign agents 402, campaign owners 404, campaign monitors 406, or sources 408 may track progress of the campaigns with which campaign agents 402, campaign owners 404, campaign monitors 406, or sources 408 are directly involved, yet information associated with the other campaigns remains private or protected.

In contrast, one or more of the engines in campaign management computer 410, such as campaign management engine 412, metrics analysis engine 414, or others, may have both vertical and horizontal access to information in campaign data stores 418, thereby permitting access to information in each campaign data store 418. In some example embodiments, metrics analysis engine 414 may analyze metrics associated with multiple active or completed campaigns and provides the results of the analysis to campaign management engine 412. Accordingly, campaign management engine 412 may predictively select one or more strategies or tactics to employ in one or more active or impending campaigns based on results provided by metrics analysis engine 414 for one or more campaigns with similar demographic characteristics to the one or more active or impending campaigns (e.g., one or more predictions discovered by prediction engine 420). In some embodiments, metrics analysis engine 414 so some or all of the services provided by metric analysis engine 414 may be provided by one or more third-party services (e.g., one or more services available under the mark MIXPANEL or others).

In one or more of the various embodiments, campaign management engine 412 adjusts strategies or tactics employed in one or more active campaigns based on results indicating that particular strategies or tactics were effective in one or more campaigns with similar characteristics to the one or more active or impending campaigns. Accordingly, because system 400 may facilitate horizontal and vertical analysis of campaigns, system 400 may facilitate analyzing or modifying campaigns more quickly than campaign owners, users, monitors or others could otherwise do on their own with vertical access, thereby improving effectiveness of campaigns: decreasing time taken to execute a campaign to a given goal, increasing resources collected in a campaign of a given duration, or others. Moreover, because campaign management engine 412 may horizontally analyze tenants of system 400, campaign management engine 412 may have and apply one or more rules to prevent competing campaigns (e.g., two or more campaigns that overlap in one or more of time, geographical territory, logical territory, or others).

Examples of campaign agents 402 may include persons, such as, administrators, managers, routers, modems, Domain Name Servers (DNS), students, teachers, athletes, or others that may identify or provide source information associated with sources 408. Examples of campaign owners 404 may include one or more computers solving one or more computational problems, network administrators, faculty in one or more academic institutions, club leaders, coaches, or others. Examples of campaign monitors 406 may include one or more computers orchestrating one or more portions of solving one or more computational problems, network switches, representatives of one or more entities supporting one or more campaigns, or others that may orchestrate various portions of initializing, launching, or executing one or more campaigns or may provide feedback to one or more campaign agents 402 or campaign owners 404 before, during, or after execution of one or more campaigns. Examples of sources 408 may include one or more candidate or actual sources of resources, such as one or more web services such as Amazon Web Services™ (AWS), seed computers in a peer-to-peer data sharing environment, power plants, electrical substations, power distribution centers (PDCs), motor controllers or motors in one or more motor control centers (MCCs), power supplies, processors, donors, or others that may be candidate or actual suppliers of resources associated with one or more campaigns.

Figure 5:
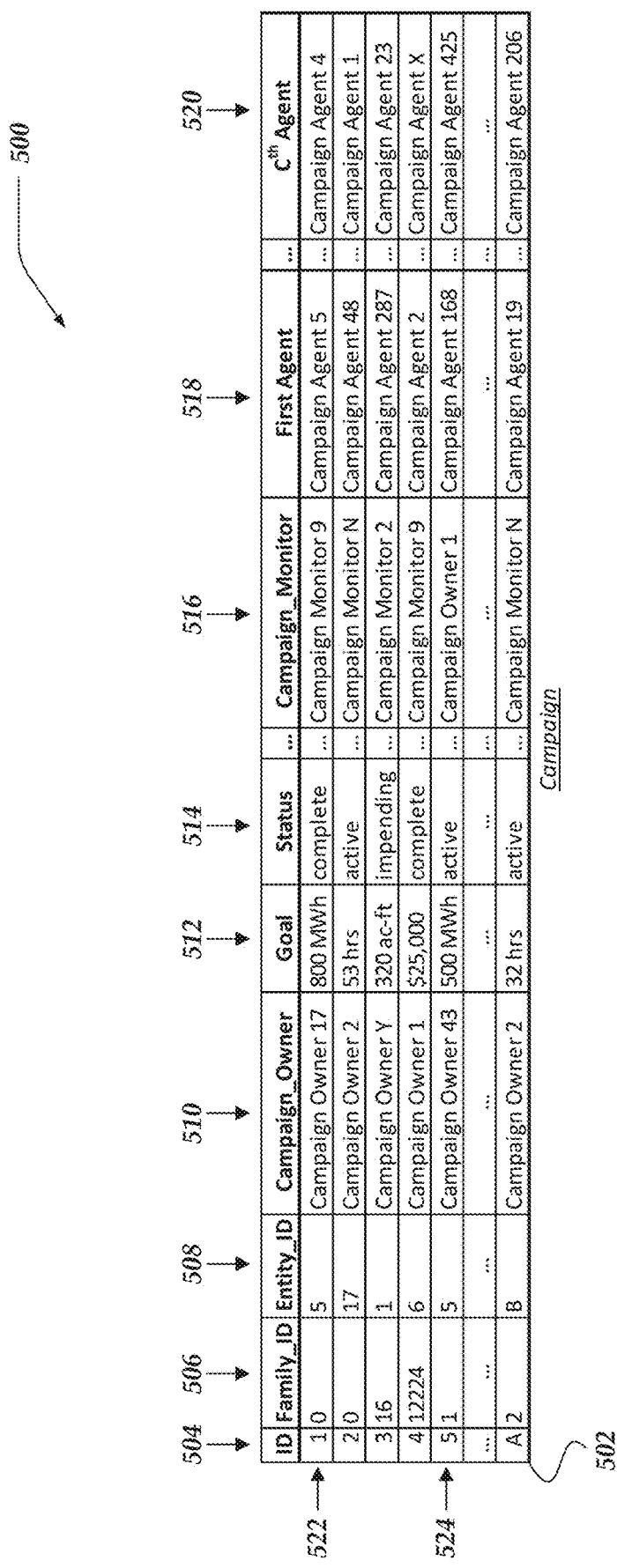
FIG. 5 illustrates a logical representation of a portion of an example data model that may be employed by the system of FIG. 4.

FIG. 5 illustrates a logical representation of a portion of example data model 500 that may be employed by system 400. In one or more of the various embodiments, data model 500 may include one or more data objects (e.g., records or others) that may represent campaigns, such as campaigns 418. In some embodiments, data model 500 may include a number of named attributes, such as ID 504, Family_ID 506, Entity_ID 508, Campaign_Owner 510, Goal 512, Status 514, Campaign_Monitor 516, First Agent 518, $C^{th}$ Agent 520, or others. For each data object, the values for identifiers, such as those shown as entries for attribute 504 or others may be sequential numbers, non-sequential numbers, strings, or others. In the example shown in FIG. 5, each data object may be defined or characterized by one or more values associated with the named attributes. For example, data object 522 with ID of one has a Family_ID of zero, Entity_ID of five, and Campaign_Owner of Campaign Owner 17.

In one or more of the various embodiments, if data model 500 involves hierarchies (e.g., trees or others), nested data models or objects, or other relationships, Family_ID values associated with attribute 506 may reference ID values associated with attribute 504 or others. Accordingly, in some of the various embodiments, data model 500 may be self-referential, thereby facilitating querying and providing information associated with relationships between multiple campaigns without referencing a further data model that includes data objects that represent relationships. Examples of relationships may include being associated with the same or related entities, the same campaign owner, the same campaign monitor, supporting the same or related activities (e.g., solving computational problems, sports, lacrosse, band, or others), the same geographic territory, the same logical territory, or others.

In the example shown in FIG. 5, data object 522 represents a campaign that is associated with entity five and Campaign Owner 17, with no parent campaigns, previously initialized campaigns associated with entity five, previously initialized campaigns associated with Campaign Owner 17, or others. In contrast, in the example shown in FIG. 5, data object 524 with ID of five has a Family_ID of 1, Entity_ID of 22, and Campaign Owner 43. Accordingly, in some embodiments, data object 524 represents a campaign that is in the same family as campaign one (data object 522) and that is associated with entity five and Campaign Owner 43. In some embodiments, data model 500 includes one or more data models for each type of element in a system, such as system 400. For example, data model 500 may include a data model for campaign agents, a data model for campaign owners, a data model for campaign monitors, a data model for campaign requests, a data model for resource contributions, or others. In some embodiments, one or more of the data models are self-referential. In some embodiments, the data objects included in the one or more data models are the data objects employed by system 400 to i) initialize, execute, or manage one or more campaigns, ii) collect or distribute resources, iii) obtain or analyze metrics, or iv) others. For clarity, portion 502 of data model 500 is shown using tabular format. In some of the various embodiments, data sets or data objects may be arranged differently, such as using different formats, data structures, objects, or others.

Figure 6:
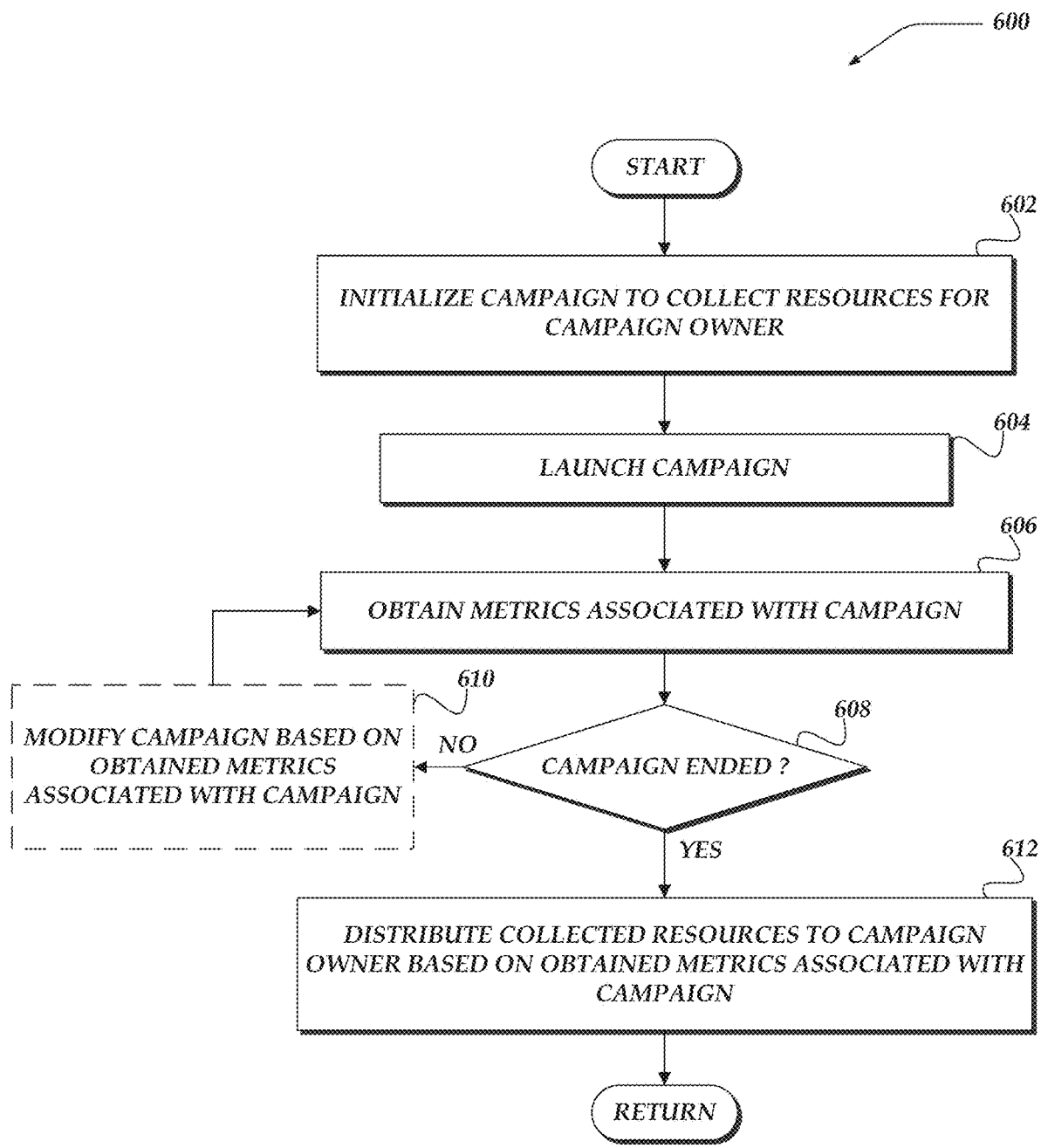
FIG. 6 shows an overview flowchart of an example process for executing campaigns to collect resources.

FIG. 6 shows an overview flow diagram of example process 600 for executing campaigns to collect resources. One or more portions of process 600 may be performed by one or more client computers or network computers (for example, client computer 200, network computer 300, or others), such as client computer 200, network computer 300, or client or network computers included in or associated with one or more of campaign agents 402, campaign owners 404, campaign monitors 406, sources 408, campaign management computer 410, or others. In some embodiments, after a start block, at block 602, one or more campaigns may be initialized for one or more campaign owners, such as a campaign to collect resources. In some embodiments, initializing the campaign may include assigning one or more campaign monitors to the campaign, onboarding or otherwise initializing communication with one or more campaign users or owners, obtaining identification or contact information associated with one or more sources (e.g., sources 408), or others. In some embodiments, initializing the campaign may begin with the one or more campaign owners communicating one or more requests over one or more networks to the one or more campaign management computers. In some embodiments, the request may be provided via a user interface (e.g., a web page, application, or others) in various forms, such as email, user interface (UI) notification, instant message, or others.

At block 604, in one or more of the various embodiments, the one or more campaigns may be launched. In some of the various embodiments, launching the one or more campaigns may include requesting resources from one or more candidate or actual sources of the resources (e.g., sources 408).

At block 606, in one or more of the various embodiments, one or more metrics associated with the one or more launched campaigns may be obtained. In some of the various embodiments, the one or more metrics may be based on one or more actions of one or more sources that are associated with one or more resource requests (e.g., one or more responses to the one or more requests, mouse clicks, types of clicks, mouse hover time, opens, visits, refreshes, timing of actions, most-recent login time, quantities of actions, or others).

At decision block 608, in one or more of the various embodiments, if the one or more campaigns have ended, control may flow to block 612; otherwise, control may flow to block 610. In some of the various embodiments, a campaign may end based on the occurrence of one or more conditions, such as meeting or exceeding one or more goals associated with the campaign, expiration of a defined duration of the campaign, arbitrary feedback from one or more campaign owners or monitors, exhausting one or more sources, each campaign agent or owner ceasing to participate in the campaign, or others.

At block 610, in one or more of the various embodiments, optionally, the one or more campaigns may be modified based on the obtained metrics. Examples of modifying a campaign may include targeting different candidate sources, retargeting previously targeted candidate or actual sources, modifying one or more characteristics of one or more requests to one or more sources, or others. Block 610 is optional because the one or more campaigns may continue without modification. For example, analysis of the one or more metrics may indicate that one or more candidate modifications will not or is unlikely to increase the effectiveness of one or more campaigns. From block 610, control loops back to block 606 to continue the one or more campaigns.

At block 612, in one or more of the various embodiments, resources collected from one or more sources may be distributed to one or more campaign agents or owners. In some of the various embodiments, the collected resources may be distributed based on the one or more obtained metrics. For example, the collected resources may be distributed based on actual or relative performance of one or more campaign agents or owners or based on availability of the collected resources.

In some embodiments, process 600 may continue operating until the collected resources have been distributed or a user configures process 600 to terminate operation. Next, control may be returned to a calling process.

FIG. 7 illustrates a logical flowchart of example process 700 for initializing campaigns. One or more portions of process 700 may be performed by one or more client computers or network computers (for example, client computer 200, network computer 300, or others), such as client or network computers included in or associated with one or more of campaign agents 402, campaign owners 404, campaign monitors 406, campaign management computer 410, or others. In one or more of the various embodiments, after a start block, at block 702, a request may be obtained to initialize a campaign, such as a campaign to collect resources. In some of the various embodiments, a campaign owner may communicate the request over one or more networks to the one or more campaign management computers. In some embodiments, the request may be provided via a user interface (e.g., a web page, application, or others) in various forms, such as email, user interface (UI) notification, instant message, or others. In some embodiments, the request may include identification information of the campaign owner or an entity that employs the campaign owner.

At block 704, in one or more of the various embodiments, campaign initialization information (e.g., campaign initialization information 214) may be obtained based on the request. In some of the various embodiments, one or more portions of the campaign initialization information may be included in the request, may be found in data storage (e.g., data storage 210, data storage 310, or others) based on the identification information, may be obtained during a communication made to the campaign owner in response to the request, or others. In some embodiments, the campaign initialization information may include demographics information (e.g., demographics information 316), schedule information (e.g., schedule information 216), or others associated with the identification information.

At block 706, in one or more of the various embodiments, one or more campaign monitors may be assigned to the campaign based on the request. In some of the various embodiments, the one or more campaign monitors may be assigned based on availability of the one or more campaign monitors or based on a geographical location of the campaign owner falling within a geographic territory associated with the one or more campaign owners. Additionally or alternatively, the campaign owner may be assigned based on a category of an activity associated with the campaign owner to facilitate providing a campaign monitor that understands objectives and motivations of the campaign owner or campaign agents associated with the campaign owner. In some embodiments, the campaign owner may be requesting a campaign to collect resources to be consumed by an activity in an activity category (e.g., type of computational problem, athletic event, club activity, or others) to which the one or more campaign owners are assigned or have more experience or knowledge than one or more other campaign monitors. Accordingly, in some embodiments, the one or more campaign management computers may assign the one or more campaign monitors based on evaluation of the campaign and the assignments, availability, experience, knowledge, or other characteristics of the one or more campaign monitors.

At block 708, in one or more of the various embodiments, campaign information associated with the one or more campaign monitors may be provided. In some embodiments, the campaign information may be provided by the one or more campaign monitors or may be pulled from data storage based on the assignment of the one or more campaign monitors. In some of the various embodiments, the campaign information may include one or more schedules, geographic locations, environmental conditions (e.g., traffic, weather, or others), or others associated with the one or more campaign monitors. In some embodiments, the schedule information may be generated by populating one or more calendars with one or more known events (e.g., federal holidays, other scheduled campaign events, or others), predicted events (e.g., periodically recurring events), or others.

At block 710, in one or more of the various embodiments, the campaign initialization information may be evaluated based on the campaign information associated with the one or more campaign monitors. In some of the various embodiments, the evaluation may include comparing one or more portions of the campaign initialization information to one or more portions of the campaign information to produce one or more results that indicate overlapping information in the compared portions. In some embodiments, the campaign initialization information may indicate one or more characteristics preferred by the campaign owner for engaging in one or more campaign events (e.g., date, time, location, or others), and the campaign information may include one or more portions of schedule information that indicate availability of the one or more campaign owners. In some embodiments, if the one or more results of the evaluation indicate that one or more portions of the campaign initialization information or the campaign information fail to align with the other, the evaluation may include iteratively expanding the one or more evaluated portions of the campaign initialization information or the campaign information or may include selecting one or more different portions of the campaign initialization information or the campaign information to employ in the evaluation. In some embodiments, various evaluated portions may be assigned one or more scores that are compared to select one or more evaluated portions that most closely align based on the one or more scores. In some embodiments, one or more of an aggregate score, multiple sub-scores, or others may be employed for the evaluations.

In one or more of the various embodiments, the selection of the one or more candidate times may be based on one or more machine learning models, linear regression models, heuristics models, or others derived from relevant historical metrics for one or more other campaigns. In some embodiments, such information may be associated with one or more other campaigns, campaign owners, entities, campaign agents, campaign monitors, geographical or logical territories, or others having one or more characteristics that correspond to one or more characteristics of one or more of the requested campaign, campaign owner, entity, one or more campaign agents, campaign monitor, geographical or logical territory, or others. The one or more machine learning models, linear regression models, heuristics models, or others may be employed to discover one or more candidate times that are predicted to provide higher performance levels than one or more other candidate times (e.g., one or more predictions discovered by prediction engine 420). In other embodiments, one or more machine learning models, linear regression models, heuristics models, or others may be applied to historical metrics for one or more other campaigns associated with one or more data objects of one or more of the campaign owner, entity, one or more campaign agents, campaign monitor, or others to provide one or more portions of the discoveries. In some embodiments, the one or more scores may be assigned based on the discoveries. For example, the campaign owner may request that the campaign event be scheduled on a Sunday, yet the one or more discoveries may indicate that campaigns having one or more characteristics that correspond to one or more characteristics of the requested campaign collect more resources when the campaign event is scheduled for Tuesdays than Sundays. For example, in some embodiments, a deep-learning artificial neural network may be trained using historical information to classify or identify one or more candidate times that are predicted to have higher performance levels (e.g., increased magnitude in contributed resources, increased quantity in resource contributions, or others) (e.g., one or more predictions discovered by prediction engine 420).

At block 712, in one or more of the various embodiments, one or more candidate times for one or more campaign events may be selected based on the evaluation. In some of the various embodiments, the one or more candidate times may be selected based on one or more scores assigned to one or more evaluated portions of the campaign initialization information or the campaign information. In some embodiments, the earliest available one or more candidate times or may be selected. In some embodiments, the first one or more candidate times to be found by the evaluation may be selected.

At block 714, in one or more of the various embodiments, the one or more selected candidate event times may be provided to the one or more campaign monitors. In some of the various embodiments, the one or more campaign monitors may be provided an opportunity to accept or reject the one or more candidate event times arbitrarily or based on information that is not available to the one or more campaign management computers, such as scheduling conflicts, traffic information, or other information not included in the campaign information. In some embodiments, the one or more campaign management computers may provide the one or more selected candidate event to an application installed in one or more client computers associated with the one or more candidate monitors, causing the application to display the one or more selected candidate event times.

At decision block 716, in one or more of the various embodiments, if the one or more selected candidate event times are accepted, control may flow to block 718; otherwise, control may flow to block 720.

At block 718, in one or more of the various embodiments, initializing the campaign may be finished based on the one or more accepted event times. In some embodiments, one or more events may be scheduled based on the scheduling of one or more milestone events (e.g., a first communication between the campaign monitor and the campaign owner, first physical contact between the campaign monitor and the campaign owner, start date for the campaign, or others) at a time or date that precedes or follows the one or more milestone events by one or more predetermined numbers of days or amounts of time. In some embodiments, finishing initialization of the campaign may include various interactions, such as repeating one or more portions of one or more of blocks 702-716 or 720. In some embodiments, finishing initialization of the campaign may include communicating one or more prelaunch reminders over one or more networks to the one or more campaign owners or agents as the start date for the campaign approaches.

At block 720, in one or more of the various embodiments, one or more portions of the campaign information associated with the campaign monitor may be modified based on the one or more selected candidate event times. In some of the various embodiments, because the one or more selected candidate event times was not accepted, the campaign information may be modified to indicate that the campaign monitor is not available for the one or more selected candidate event times. Block 720 is optional because another one or more candidate event times may be evaluated without modifying the campaign information associated with the campaign monitor.

In some embodiments, process 700 may continue operating until the collected resources have been distributed or a user configures process 700 to terminate operation. Next, control may be returned to a calling process.

FIG. 8 shows a logical flow diagram of example process 800 for assigning network monitors to campaigns. One or more portions of process 800 may be performed by one or more client computers or network computers (for example, client computer 200, network computer 300, or others), such as client or network computers included in or associated with one or more of campaign agents 402, campaign owners 404, campaign monitors 406, campaign management computer 410, or others. In one or more of the various embodiments, after a start block, at block 802, a request may be obtained to initialize a campaign, such as a campaign to collect resources. In some of the various embodiments, a campaign owner may communicate the request over one or more networks to the one or more campaign management computers. In some embodiments, the request may be provided via a user interface (e.g., a web page, application, or others) in various forms, such as email, user interface (UI) notification, instant message, or others. In some embodiments, the request may include identification information of the campaign owner, identification information of an entity that employs or hosts the campaign owner, identification of one or more activities associated with the campaign owner (e.g., solving computational problems, sports, lacrosse, band, or others), or others.

At block 804, in one or more of the various embodiments, a pool of available campaign monitors may be provided based on the request. In some of the various embodiments, the pool may be generated based on evaluation of one or more data objects associated with one or more campaign monitors (e.g., campaign monitors 406) to produce one or more results that indicate whether the one or more campaign monitors have one or more territories (e.g., logical territories, geographical territories, or others) that overlap one or more characteristics of the campaign owner, entity, or associated activities. For example, the pool may include each campaign monitor that has a geographical territory that includes the location of the entity associated with the campaign owner. In some embodiments, one or more qualifying campaign monitors may be provided an opportunity to opt in or out of the pool, such as a push notification or prompt provided to a client computer associated with the campaign monitor.

At decision block 806, in one or more of the various embodiments, if the pool includes one or more campaign monitors, control may flow to block 808; otherwise, control may flow to block 822.

At block 808, in one or more of the various embodiments, each qualifying campaign monitor may be evaluated based on one or more characteristics of the campaign. In some of the various embodiments, a data object associated with the requested campaign may include one or more characteristic values associated with one or more attributes obtained from the request, derived from the request, or otherwise populated based on information in the request, such as referencing one or more other data objects that includes information associated with the campaign owner or entity. In some embodiments, one or more data objects associated with the one or more qualifying campaign monitors may be evaluated to provide one or more results that indicate whether the one or more campaign monitor data objects include one or more characteristic values that correspond to the one or more characteristic values associated the campaign. For example, out of two or more qualifying campaign monitors that have geographical territories that include the requested campaign, one qualifying campaign monitor may be considered to have one or more characteristic values that correspond to the one or more characteristic values associated with the campaign because the campaign monitor is associated with resource consuming activities associated with the campaign (e.g., solving a particular type of computational problem, a particular sport, a particular club activity, or others).

In one or more of the embodiments, the one or more characteristic values may include demographics information (e.g., demographics information 316 or others) associated with the requested campaign, the campaign owner, the entity, or others. In some of the various embodiments, the characteristic values may indicate one or more activities that will consume resources (e.g., resources to be collected in the campaign), such as type of computational problem, athletic event, club activity, or others. In some embodiments, the characteristic values may indicate one or more estimated or predicted sizes of the requested campaign (e.g., one or more of number of campaign owners, campaign agents, campaign monitors, resource requests, sources, requested resources, collected resources, distributed resources, rewards to campaign agents, rewards to campaign monitors, or others) (e.g., one or more predictions discovered by prediction engine 420).

In one or more of the various embodiments, one or more estimated or predicted sizes of the requested campaign may be based on one or more machine learning models, linear regression models, heuristics models, or others derived from historical metrics for one or more other campaigns, such as one or more models employed by prediction engine 420. In some of the various embodiments, such information may be associated with one or more other campaigns, campaign owners, entities, campaign agents, campaign monitors, geographical or logical territories, or others having one or more characteristics that correspond to one or more characteristics of one or more of the requested campaign, campaign owner, entity, one or more campaign agents, geographical or logical territory, or others. The one or more machine learning models, linear regression models, heuristic models, or others may be employed to discover a predicted size of the requested campaign. For example, in some embodiments, a deep-learning artificial neural network may be trained using historical information to classify or identify one or more predicted sizes, such as one or more deep-learning artificial neural networks employed by prediction engine 420.

At block 810, in one or more of the various embodiments, each qualifying campaign monitor may be evaluated based on one or more characteristics of one or more other campaigns associated with the qualifying campaign monitor. In some of the various embodiments, the historical performance of each qualifying campaign monitor in one or more prior or concurrent campaigns that have one or more characteristics that correspond to the requested campaign may be evaluated to provide one or more results that indicate a predicted performance for the qualifying campaign monitor in the requested campaign (e.g., one or more predictions discovered by prediction engine 420). In some embodiments, the number of prior or concurrent campaigns or the date associated with the first-in-time campaign associated with each qualifying campaign monitor may be evaluated to provide one or more results that indicate the seniority of the qualifying campaign monitor.

In some embodiments, the size of one or more campaigns associated with each qualifying campaign monitor in a moving historical window (e.g., one month, six months, one year, or others) may be evaluated based on the estimated or predicted size of the requested campaign to provide one or more results that indicate the estimated total size of the campaigns associated with the qualifying campaign monitor in the moving historical window (e.g., one or more predictions discovered by prediction engine 420). In some embodiments, the one or more qualifying campaign monitors may be evaluated based on their experience or performance with or one or more other campaigns having one or more characteristic values that are similar to the requested campaign.

At block 812, in one or more of the various embodiments, one or more scores may be assigned to each qualifying campaign monitor based on the one or more evaluations in one or more of block 808 or block 810. In some of the various embodiments, one or more scores may be assigned based on one or more evaluation results that indicate an expected level of performance of each qualifying campaign monitor in the requested campaign. In some embodiments, one or more scores may be assigned based on available capacity of each qualifying campaign monitor, expected capacity consumption for the requested campaign, or others. In some embodiments, capacity of a qualifying campaign monitor may be determined based on one or more machine learning models, linear regression models, heuristics models, or others derived from relevant historical metrics for one or more other campaigns. In some embodiments, such information may include information associated with the qualifying campaign monitor, such as one or more historical campaigns monitored by the qualifying campaign monitor, historical campaigns monitored by one or more other campaign monitors with one or more similar characteristic values to the qualifying campaign monitor, or others. In other embodiments, capacity of the qualifying campaign monitor may automatically increase based on one or more promotions, seniority, or others.

In some embodiments, one or more score may be assigned to each qualifying campaign monitor for each evaluation. In some embodiments, the one or more scores may be combined into a single score for each qualifying campaign monitor. In some embodiments, the totality of the results of the one or more evaluations for each qualifying campaign monitor may be assigned a score. In some embodiments, the one or more scores may be based on one or more machine learning models, linear regression models, heuristics models, or others derived from historical metrics for one or more other campaigns. In some embodiments, such information may include information associated with each qualifying campaign monitor, such as one or more historical campaigns monitored by the qualifying campaign monitor, historical campaigns monitored by one or more other campaign monitors with one or more similar characteristic values to the qualifying campaign monitor, or others. Accordingly, in some embodiments, the one or more scores may be employed to predict success of the one or more qualifying campaign monitors in the requested campaign, such as based on one or more predictions discovered by prediction engine 420.

At block 814, in one or more of the various embodiments, the one or more scores for each qualifying campaign monitor may be compared to one or more thresholds. In some of the various embodiments, the one or more thresholds may include one or more static or predetermined thresholds, dynamic thresholds that are based on one or more statistical measures (e.g., top third, top two, top one, mean, median, or others) of the one or more scores of the one or more qualifying campaign monitors, or others. In some embodiments, one or more thresholds may be applied for an aggregate score associated with the one or more results of the one or more evaluations, for sub-scores associated with each of the one or more results of the one or more evaluations, or for others.

At decision block 816, in one or more of the various embodiments, if one or more qualifying campaign monitors has one or more scores that satisfies the one or more thresholds, control may flow to block 818; otherwise, control may flow to block 822. In some of the various embodiments, one or more scores may be acceptable if they are below the one or more thresholds. For example, a qualifying campaign monitor may be considered available if the qualifying campaign monitor has a capacity consumption score that is sufficiently low to indicate that the campaign monitor has enough remaining capacity to monitor the requested campaign and may otherwise be considered unavailable. In other embodiments, one or more scores may be acceptable if they meet or exceed the one or more thresholds. For example, a qualifying campaign monitor may be considered available if the qualifying campaign monitor has a historical performance score that is sufficiently high to indicate that the campaign monitor is likely to have the highest performance for the requested campaign in comparison to one or more other qualifying campaign monitors based on the characteristics of the requested campaign. In some embodiments, a qualifying campaign monitor may be considered available if each of the one or more scores satisfies a corresponding threshold and may otherwise be considered unavailable. In other embodiments, a qualifying campaign monitor may be considered available if one or more of the one or more scores satisfies a corresponding threshold and may otherwise be considered unavailable.

At block 818, in one or more of the various embodiments, one or more campaign monitors may be selected based on the one or more scores associated with the one or more campaign monitors. In some of the various embodiments, the one or more scores associated with each qualifying campaign monitor may be aggregated (e.g., summed, averaged, or others), and the qualifying campaign monitor with the best score (e.g., highest, lowest, closest to a target, or others) may be selected. In some embodiments, the qualifying campaign monitor with the highest quantity of acceptable scores may be selected. In some embodiments, the qualifying monitor with the highest quantity of best scores (e.g., highest, lowest, closest to a target, or others) or the best aggregate of rankings of scores may be selected.

At block 820, in one or more of the various embodiments, the selected campaign monitor may be assigned to the campaign. In some of the various embodiments, the selected campaign monitor may be notified of the selection and may accept or reject the assignment. In some embodiments, if the selected campaign monitor rejects the assignment, the selected campaign monitor may be removed from the pool and control may flow back to decision block 816 (not shown).

At block 822, in one or more of the various embodiments, one or more notifications may be provided to indicate that the pool fails to include an available campaign monitor. In some of the various embodiments, the one or more notifications may include one or more notifications to campaign management computer that indicate that an in-house campaign monitor should be assigned to the campaign. In some embodiments, the campaign management computer may execute one or more portions of one or more blocks in process 800 to assign one or more in-house campaign monitors to the campaign. In other embodiments, the campaign management computer may be arranged to arbitrarily, rotatably (e.g., round-robin or others), or otherwise assign an in-house campaign monitor to the campaign. In some embodiments, one or more campaign monitors may be moved across one or more territories to increase expertise available in one or more new territories, struggling territories, or others based on various metrics associated with the one or more campaign monitors (e.g., one or more of seniority, historical metrics associated with previous campaigns, or others).

In some embodiments, process 800 may continue operating until one or more campaign monitors have been assigned to the campaign or a user configures process 800 to terminate operation. Next, control may be returned to a calling process.

FIG. 9 illustrates a logical flowchart of example process 900 for launching campaigns. One or more portions of process 900 may be performed by one or more client computers or network computers (for example, client computer 200, network computer 300, or others), such as client or network computers included in or associated with one or more of campaign agents 402, campaign owners 404, campaign monitors 406, campaign management computer 410, or others. In one or more of the various embodiments, after a start block, at block 902, a request to initialize a campaign may be obtained, such as a campaign to collect resources. In some of the various embodiments, a campaign owner may communicate the request over one or more networks to the one or more campaign management computers. In some embodiments, the request may be provided via a user interface (e.g., a web page, application, or others) in various forms, such as email, user interface (UI) notification, instant message, or others.

At block 904, one or more campaign agents associated with the campaign may be identified. In some of the various embodiments, the request may include agent identification information associated with the one or more campaign agents. In some embodiments, the agent identification information may be found in one or more data stores (e.g., one or more campaign repositories 416, prior contact databases, previously provided databases such as voter registrations or others, third-party sources of agents, or others) based on other information included in the request. In other embodiments, the agent identification information may be provided by one or more campaign initialization engines (e.g., one or more engines included in applications 220 or others) installed, loaded, opened, or otherwise initialized by the one or more campaign owners or agents. For example, the campaign management computer may populate one or more data objects (e.g., one or more records, files, documents, or others) with one or more initialization identifiers associated with the campaign, the campaign monitor may provide the one or more data objects to the one or more campaign owners or agents, the one or more campaign owners or agents may input the one or more data objects or the one or more initialization identifiers (e.g., one or more join codes, pairing keys, pass-phrases, Globally Unique Identifiers (GUIDs), or others) in the one or more campaign initialization engines along with agent identification information associated with the one or more campaign agents, and the campaign initialization engine may communicate the agent identification information over one or more networks to the campaign management computer, thereby facilitating identifying the one or more campaign agents associated with the campaign. In some embodiments, the campaign management engine may generate one or more data objects (e.g., one or more data objects in campaign repository 416 or others) associated with each identified campaign agent, populate the one or more data objects with the agent identification information, and may associate the one or more data objects with the campaign. In some embodiments, one or more campaign owners may be associated with a campaign (e.g., one or more subgroups associated with each campaign owner or others), and one or more campaign agents may be assigned to various campaign secondary owners (e.g., assigned to one or more subgroups of the campaign or others). For example, a football team may have each assistant coach associated with a head coach, each defensive player associated with one or more defensive assistant coaches, each offensive player associated with one or more offensive coaches, or others, that may act as secondary campaign owners for their respective agent groups.

At block 906, in one or more of the various embodiments, one or more candidate sources (e.g., one or more sources 408 or others) may be identified based on source identification information provided by the one or more campaign agents. In some of the various embodiments, the one or more campaign agents may communicate the source identification information associated with the one or more candidate sources over one or more networks to the campaign management computer. In some embodiments, the one or more campaign agents may provide the source identification information associated with the one or more candidate sources by inputting the source identification information in the campaign initialization engine. In some embodiments, the campaign initialization information may provide an option to import one or more portions of source identification information from one or more prior campaigns associated with the one or more campaign agents, such as one or more portions of source information associated with the one or more agent data objects in the campaign data repository.

At block 908, in one or more of the various embodiments, the quality of the source identification information may be evaluated based on metrics associated with one or more other campaigns. In some embodiments, the source identification information may include contact information (e.g., email address, IP address, phone numbers, or others). In some of the various embodiments, the quality of the source information may be evaluated based on one or more defined rules or patterns, such as one or more defined rules or patterns that verify that the source information adheres to one or more formats, does not include duplicates, has not failed to produce results or metrics when used in the past, is not provided with one or more quantities of other portions of contact information that exceeds one or more thresholds, or others. Conversely, in some embodiments, the source identification may not be verified if one or more of the evaluation conditions are not satisfied. In some embodiments, one or more configuration files, rules, custom scripts, or others may be executed to verify the source identification information. In some embodiments, one or more portions of source information that has not been verified based on one or more results of the evaluations may be discarded. In some embodiments, the campaign monitor, one or more campaign agents, or campaign owner may be notified if the source identification information fails to have a quality that meets or exceed a threshold. In some embodiments, the one or more campaign agents may not proceed in process 900 until source identification information having a quality that meets or exceeds the threshold is provided. For example, the one or more campaign agents that provided the one or more discarded portions of the source information may be required to provide additional source information may be required to replace some or all of the one or more discarded portions of the source information. In some embodiments, the replacement may occur prior to attempting to provide one or more resource collection requests based on the discarded source information. In other embodiments, the replacement may occur after first attempting to provide one or more resource collection requests based on the discarded source information.

At decision block 910, in one or more of the various embodiments, if the campaign is ready to start, control may flow to block 912; otherwise, control may flow to block 906. In some of the various embodiments, the campaign may be ready to start when each of the one or more campaign agents has provided source identification information for a predetermined number of sources with a quality that meets or exceeds the threshold. In other embodiments, the campaign may be ready to start arbitrarily, based on user input, at a predetermined time or date, one or more conditions being met, or others. For example, in some embodiments, the campaign engine may be arranged to employ configuration information, rule-based policies, or others to determine if a campaign should start.

At block 912, in one or more of the various embodiments, one or more resource collection requests may be provided to each identified candidate source based on metrics associated with one or more other campaigns. In some of the various embodiments, the selection or composition of the one or more resource collection requests may be based on one or more machine learning models, linear regression models, heuristics models, or others derived from relevant historical metrics for one or more other campaigns. In one or more of the various embodiments, such information may include information associated with one or more other campaign owners, entities, campaign agents, campaign monitors, geographical or logical territories, sources, others having similar demographics information, or others having one or more characteristics that correspond to one or more characteristics of the campaign, campaign owner, entity, one or more campaign agents, campaign monitor, geographical or logical territory, or others. The one or more machine learning models, linear regression models, heuristics models, or others, such as one or more models employed by prediction engine 420, may be employed to discover resource collection request characteristics that are predicted to provide greater resource collection results than other resource collection request characteristics. In other embodiments, one or more machine learning models, linear regression models, heuristics models, or others may be applied to historical metrics for one or more other campaigns associated with one or more data objects of one or more of the campaign owner, entity, one or more campaign agents, campaign monitor, one or more sources, or others to provide one or more portions of the discoveries. In some embodiments, the one or more resource collection requests may be provided based on the discoveries. For example, in some embodiments, a deep-learning artificial neural network may be trained using historical information to classify or identify one or more features of resource collection requests that are predicted to have increased success rates (e.g., increased magnitude in contributed resources, increased quantity in resource contributions, or others).

In one or more of the various embodiments, the one or more resource collection requests may be provided at times that have been determined to provide greater resource collection results than other times, with information that has been determined to provide greater resource collection results than other information, with interface components that have been determined to provide greater resource collection results than other interface components, with one or more types of instruction information (telephone numbers, email addresses, SMS short-codes, one or more Uniform Resource Identifiers (URIs), such as one or more Uniform Resource Locators (URLs) (e.g., one or more tracking URLs or others) or others that identify one or more system mechanisms or components, such as one or more web pages or others that facilitate providing resources from sources for the campaign) that are determined to provide greater resource collection results than other types of instruction information, or others. In some of the various embodiments, the one or more resource collection requests may include visibly apparent agent identification information (e.g., one or more photographs of the one or more campaign agents, one or more telephone numbers of the one or more campaign agents, one or more email addresses of the one or more phone numbers, one or more names of the one or more campaign agents, or others that are visibly apparent to an unaided human eye) or other identification information (e.g., a phone number associated with SMS messages provided by system 400 or others). In some embodiments, the one or more resource collection requests may include template content that is dynamically populated with content information associated with the one or more campaign agents. In other embodiments, the one or more resource collection requests may include custom content provided by the one or more campaign agents. Similar to the selection of collection requests described above, in one or more of the various embodiments, one or more machine learning models, linear regression models, heuristics models, or others may be employed to identify delivery methods or delivery times that may be predicted to be more effective for given campaigns or campaign sources, such as one or more models employed by prediction engine 420.

In some embodiments, process 900 may continue operating until one or more resource collection requests have been provided to each identified candidate source or a user configures process 900 to terminate operation. Next, control may be returned to a calling process.

Figure 10:
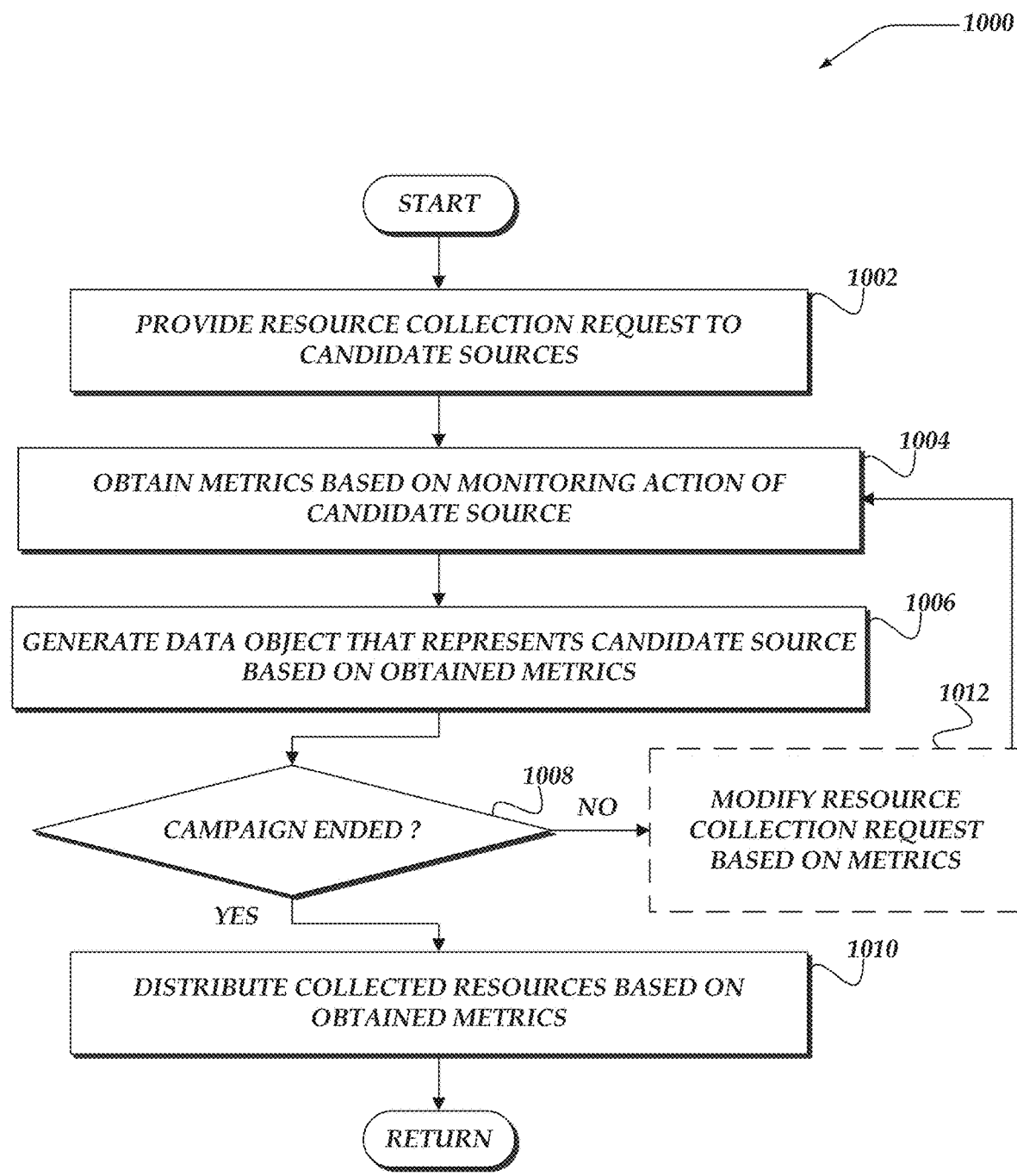
FIG. 10 shows a logical flowchart of an example process for obtaining metrics associated with campaigns.

FIG. 10 shows a logical flow diagram of example process 1000 for obtaining metrics associated with campaigns. One or more portions of process 1000 may be performed by one or more client computers or network computers (for example, client computer 200, network computer 300, or others), such as client or network computers included in or associated with one or more of campaign agents 402, campaign owners 404, campaign monitors 406, sources 408, campaign management computer 410, or others. In one or more of the various embodiments, after a start block, at block 1002, one or more resource collection requests may be provided to one or more candidate sources (e.g., one or more sources 408). In some embodiments, each resource collection request may include instruction information, such as one or more telephone numbers, email addresses, SMS short-codes, one or more Uniform Resource Identifiers (URIs), such as one or more Uniform Resource Locators (URLs) (e.g., one or more tracking URLs or others) or others that identify one or more system mechanisms or components, such as one or more web pages or others that facilitate providing resources from sources for the campaign. In some embodiments, the instruction information for each campaign agent may include or be associated with agent identification information that is uniquely associated with the campaign agent to facilitate associating metrics with the campaign agent.

In one or more of the various embodiments, the one or more resource collection requests may be automatically broadcasted, posted, shared, or otherwise provided on one or more mediums or platforms, such as radio, television, newspaper, social media (e.g., FACEBOOK, TWITTER, INSTAGRAM, or others), or others. In other embodiments, each campaign agent may install, load, open, or otherwise initialize one or more campaign initialization engines (e.g., one or more engines included in applications 220 or others) that provides each campaign agent with the instruction information for distribution on the one or more mediums or platforms. In some of the various embodiments, the one or more resource collection requests may be provided in direct messages, group messages, posts on individual walls, posts on group walls, posts in newsfeeds, individualized tags, or others. In some embodiments, the one or more resource collection requests may be provided from a phone number associated with the campaign, the one or more agents' phone numbers, one or more email addresses associated with the campaign, the one or more agents' email addresses, or others. For example, when a campaign agent employs the campaign initialization engine in a browser on a desktop computer to send one or more SMS messages to one or more sources, the one or more SMS messages may be provided from a phone number associated with the campaign. As another example, when the campaign agent employs the campaign initialization engine in mobile phone to send one or more SMS messages to one or more sources, the one or more SMS messages may be provided from the phone number associated with the mobile phone. In some embodiments, content included in the one or more resource collection requests may be generated by the campaign initialization information, the agent, or others.

At block 1004, in one or more of the various embodiments, metrics may be obtained based on monitoring one or more actions of the one or more sources. In some of the various embodiments, source interactions with the one or more campaign requests may trigger metrics information to be communicated over one or more networks to the campaign management computer. In some embodiments, the instruction information may include a tracking URL that includes token information, such as token information appended to the end of an otherwise normal URL. In some embodiments, a source may install, load, open, or otherwise initialize one or more system components (e.g., browser, web page, application, or others) that parse the URL, recognize the token information, or provide metrics to the campaign management computer based on the token information when the source interacts with the instruction information. In some embodiments, the token information may identify the campaign agent associated with the tracking URL, the campaign, contact information associated with the campaign management computer, or others. In some embodiments, one or more configuration files, rules, custom scripts, or others may be executed to parse the URL, recognize the token information, or provide the metrics. In some embodiments, the metrics may include share types, page views, interactions with one or more pages, originator of the one or more campaign requests, platform of origination of the one or more campaign requests, date, time of day, frequency, duration, type, application used by the source to view the instruction information, user-interface interaction (e.g., mouse clicks, types of clicks, mouse hover time, opens, visits, refreshes, timing of actions, most-recent login time, quantities of actions, or others), delay between providing the request and the interaction, quantities of resource provisions, magnitude of resources provided, location information associated with the one or more sources, GPS information, IP address information, or others.

At block 1006, in one or more of the various embodiments, one or more data objects (e.g., one or more records, files, or others) that represent one or more candidate sources may be generated based on the obtained metrics. In some of the various embodiments, each data object may be provided with an identifier associated with each candidate source and populated with provided, derived, found, or otherwise obtained metrics information associated with the candidate source. In some embodiments, candidate sources may be identified based on various metrics information, such as IP address, identification or contact information that the candidate source inputs in one or more fields (e.g., one or more UI fields or others), identification or contact information provided by the one or more campaign agents, or others. In some embodiments, the one or more data objects may have been previously generated, such as in another campaign, based on a prior interaction, or others.

At decision block 1008, in one or more of the various embodiments, if the campaign has ended, control may flow to block 1010; otherwise, control may flow to block 1012. In some of the various embodiments, a campaign may end based on the occurrence of one or more conditions, such as meeting or exceeding one or more goals associated with the campaign, expiration of a defined duration of the campaign, arbitrary feedback from one or more campaign owners or monitors, exhausting one or more sources, each campaign agent or owner ceasing to participate in the campaign, or others.

At block 1010, in one or more of the various embodiments, collected resources may be distributed based on the obtained metrics. In some of the various embodiments, a subset of the collected resources may be provided to the one or more campaign owners based on consumption information. In some embodiments, one or more portions of the collected resources may be consumed during the campaign, such as inefficiencies, storage costs, expenses, or others. In some embodiments, the consumption information may be estimated during the campaign to provide one or more running estimates of the collected resources. In some embodiments, a final calculation of the consumption information may be made when the campaign is completed. In other embodiments, the collected resources may be distributed throughout the campaign, such as when goals are met or others.

At block 1012, in one or more of the various embodiments, optionally, one or more resource collection requests may be modified based on the obtained metrics. In some of the various embodiments, block 1012 is optional because the one or more sources may be retargeted only if the one or more sources failed to contribute resources. In other embodiments, the one or more sources may be retargeted regardless of prior contributions. In some embodiments, the one or more sources may be classified or categorized based on evaluation of the one or more data objects associated with the one or more sources, such as evaluating the one or more data objects for outlier characteristics that match or reside within a defined range of one or more characteristics that are indicative of one or more classes. In some embodiments, one or more resource collection requests may be selected for employment in the retargeting process by default and may be replaced or otherwise modified if analysis of the obtained metrics associated with one or more sources includes one or more outliers (e.g., one or more outliers relevant to the one or more sources in the same campaign, relevant to one or more sources in one or more other campaigns, or others) based on one or more evaluations of the metrics.

In one or more of the various embodiments, the selection or composition of the one or more resource collection requests may be based on one or more machine learning models, linear regression models, heuristics models, or others derived from relevant historical metrics for one or more other campaigns. In some of the various embodiments, such information may include information associated with one or more other campaign owners, entities, campaign agents, campaign monitors, geographical or logical territories, sources, others having similar demographics information, or others having one or more characteristics that correspond to one or more characteristics of the campaign, campaign owner, entity, one or more campaign agents, campaign monitor, geographical or logical territory, or others. The one or more machine learning models, linear regression models, heuristics models, or others may be employed to discover one or more key indicators that are predicted to identify one or more sources associated with one or more classes or categories of sources, such as one or more models employed by prediction engine 420. In other embodiments, one or more machine learning models, linear regression models, heuristics models, or others may be applied to historical metrics for one or more other campaigns associated with one or more data objects of one or more of the campaign owner, entity, one or more campaign agents, campaign monitor, one or more sources, or others to provide one or more portions of the discoveries. In some of the various embodiments, the one or more key indicators may include one or more values or ranges of values that, if found in or overlap with one or more values included in one or more data objects associated with the one or more sources, indicate that the one or more sources may belong to the one or more associated classes or categories. In some embodiments, the one or more models may employ clustering or other processes. For example, in some embodiments, a deep-learning artificial neural network may be trained using historical information to classify or identify one or more sources.

In one or more of the various embodiments, one or more retargeting strategies or tactics may be selected based on metrics associated with the previous employment with one or more other sources in the same one or more classes or categories as the one or more sources and that subsequently contributed resources. In some of the various embodiments, the selection or composition of the one or more retargeting strategies or tactics may be based on one or more machine learning models, linear regression models, heuristics models, or others derived from relevant historical metrics for one or more other campaigns associated with one or more data objects of one or more other campaign owners, entities, campaign agents, campaign monitors, geographical or logical territories, sources, others having similar demographics information, or others having one or more characteristics that correspond to one or more characteristics of the campaign, campaign owner, entity, one or more campaign agents, campaign monitor, geographical or logical territory, or others. In some embodiments, the one or more machine learning models, linear regression models, heuristics models, or others may be employed to discover one or more correlations between classes or categories of sources and retargeting strategies or tactics that are predicted to result in the one or more retargeted sources in the classes or categories contributing resources, such as one or more models employed by prediction engine 420. In other embodiments, one or more machine learning models, linear regression models, heuristics models, or others may be applied to historical metrics for one or more other campaigns associated with one or more data objects of one or more of the campaign owner, entity, one or more campaign agents, campaign monitor, one or more sources, or others to provide one or more portions of the discoveries. For example, one or more classes or categories of sources may include sources that first interact with the instruction information before sunrise, perform a few brief interactions with the one or more system components, and contribute resources when provided with one or more resource collection requests the following morning. As another example, sources in one or more other classes or categories may not respond to weekday resource collection requests. For example, in some embodiments, a deep-learning artificial neural network may be trained using historical information to classify or identify one or more features of resource collection requests that are predicted to have increased success rates (e.g., increased magnitude in contributed resources, increased quantity in resource contributions, or others), such as one or more deep-learning networks employed by prediction engine 420.

In one or more of the various embodiments, the one or more selected retargeting strategies or tactics may be employed when retargeting the one or more sources. In some of the various embodiments, the one or more system components initialized by the one or more sources may be modified based on the obtained metrics. For example, the one or more system components may be modified to employ one or more interface components (e.g., one or more check boxes, radio buttons, text fields, or others) based on evaluation of the obtained metrics indicating that the one or more other sources contribute more resources when the one or more system components employs the one or more interface components than when the one or more system components employs one or more other interface components. In some embodiments, timing of the one or more resource collection requests may be modified based on the obtained metrics. For example, when retargeting the one or more sources, the one or more resource collection requests may be provided when an actual or derived location of the one or more sources has cloudy, cold, or rainy weather based on the obtained metrics including location information (e.g., included in the source information, derived from GPS information, derived from IP address information, or others) associated with the one or more sources, correlating the location information with weather information, and the evaluation of the metrics indicating that the one or more other sources provide more resources in cloudy, cold, or rainy weather (e.g., fewer outdoor activities may be available to sources 408 in cloudy, cold, or rainy weather). In some embodiments, language, grammar, included information, images, or other content may be modified based on the obtained metrics.

Also, in one or more of the various embodiments, the relative value of the request resources versus the expense of providing the resource collection may be considered during the selection of retargeting strategies. In some embodiments, one or more rules or conditions may be defined such that more expensive retargeting strategies may be employed for the resource requests of higher value. In contrast, in some embodiments, one or more rules or conditions may be defined such that less expensive retargeting strategies may be employed for the resource requests of lesser value.

In some embodiments, process 1000 may continue operating until the campaign ends or a user configures process 1000 to terminate operation. Next, control may be returned to a calling process.

Figure 11:
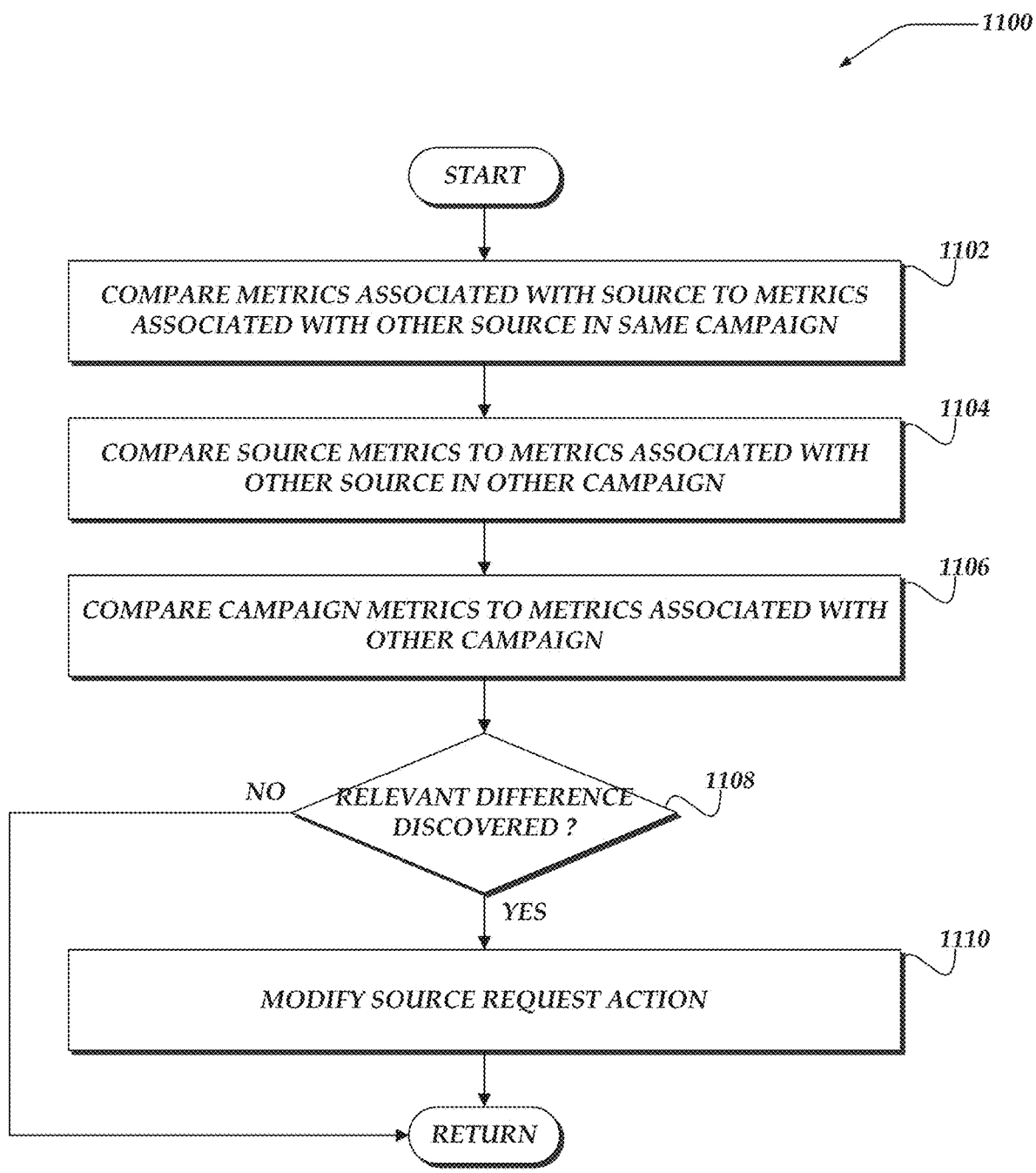
FIG. 11 illustrates a logical flow diagram of an example process for modifying collection requests.

FIG. 11 illustrates a logical flowchart of example process 1100 for modifying collection requests. One or more portions of process 1100 may be performed by one or more client computers or network computers (for example, client computer 200, network computer 300, or others), such as client or network computers included in or associated with one or more of campaign agents 402, campaign owners 404, campaign monitors 406, sources 408, campaign management computer 410, or others. In one or more of the various embodiments, after a start block, at block 1102, metrics associated with one or more sources in a campaign may be compared to metrics associated with one or more other sources in the same campaign. In some of the various embodiments, a predetermined pool of candidate source request actions (e.g., source request actions that have led to resource contributions, previously attempted source request actions, not-yet-attempted source request actions, or others) may be evaluated. In other embodiments, one or more candidate source request actions may be generated based on the comparison or evaluation.

In one or more of the various embodiments, the selection or composition of the one or more candidate source request actions may be based on one or more machine learning models, linear regression models, heuristics models, or others derived from relevant historical metrics associated with one or more other sources in the campaign having similar demographics information or one or more other characteristics that correspond to one or more characteristics of the one or more sources. In some embodiments, the one or more machine learning models, linear regression models, heuristics models, or others, such as one or more models employed by prediction engine 420, may be employed to discover one or more candidate source request actions that are predicted to lead to the one or more sources to contribute resources, to increase a quantity of resource contributions, to increase a magnitude of contributed resources, or others, at least in comparison to one or more other candidate source request actions. In some embodiments, one or more new candidate source request actions may be generated based on the discoveries. For example, when one or more trends in historical metrics may indicate that source request actions provided at times closer to sunset show a linear increase in magnitude of contributed resources as the times approach sunset, a candidate source request action may be generated to provide one or more requests to one or more sources at sunset to maximize the linear function for the greatest potential magnitude of contributed resources. In some embodiments, one or more scores may be assigned to one or more candidate source request actions based on the discoveries. For example, in some embodiments, a deep-learning artificial neural network may be trained using historical information to classify or identify one or more features of candidate source request actions that are predicted to have increased success rates (e.g., increased magnitude in contributed resources, increased quantity in resource contributions, or others) (e.g., one or more neural networks employed by prediction engine 420).

At block 1104, metrics associated with the one or more sources may be compared to metrics associated with one or more other sources in one or more other campaigns. In some of the various embodiments, the one or more candidate source request actions evaluated at block 1104 may be the same as or a subset of the source request actions evaluated at block 1104. For example, one or more filters or rules may be applied to eliminate one or more candidate source request actions that have one or more scores that are lower than one or more scores of one or more other candidate source request actions by a predetermined threshold. In other embodiments, one or more candidate source request actions may be generated based on the comparison or evaluation.

In one or more of the various embodiments, the selection, generation, or composition of one or more candidate source request actions may be based on one or more machine learning models, linear regression models, heuristics models, or others derived from relevant historical metrics for one or more other sources in one or more other campaigns. In some embodiments, such information may be associated with one or more other sources in one or more other campaigns having similar demographics information or one or more other characteristics that correspond to one or more characteristics of the one or more sources. In some embodiments, the one or more machine learning models, linear regression models, heuristic models, or others, such as one or more models employed by prediction engine 420, may be employed to discover one or more candidate source request actions that are predicted to lead to the one or more sources to contribute resources, to increase a quantity of resource contributions, to increase a magnitude of contributed resources, or others, at least in comparison to one or more other candidate source request actions. In some embodiments, one or more new candidate source request actions may be generated based on the discoveries. In some embodiments, one or more scores may be assigned to one or more candidate source request actions based on the discoveries. For example, in some embodiments, a deep-learning artificial neural network may be trained using historical information to classify or identify one or more features of candidate source request actions that are predicted to have increased success rates (e.g., increased magnitude in contributed resources, increased quantity in resource contributions, or others), such as one or more networks employed by prediction engine 420.

In one or more of the various embodiments, the information collected from other campaigns may be evaluation without exposing it to other campaign owners, sources, or agents. Accordingly, in some embodiments, information or metrics learned from the successes or failures of other campaigns may be used to improve a given campaign without exposing private or proprietary information of those other campaigns. In some embodiments, one or more campaign owners may be enabled to configure their campaigns to prevent metrics associated with their campaigns from being used for determining modifications for other campaigns.

At block 1106, metrics associated with the campaign may be compared to metrics associated with one or more other campaigns. In some of the various embodiments, the one or more candidate source request actions evaluated at block 1106 may be the same as or a subset of the source request actions evaluated at one or more of blocks 1102 or 1104. For example, one or more filters or rules may be applied to eliminate one or more candidate source request actions that have one or more scores that are lower than one or more scores of one or more other candidate source request actions by a predetermined threshold. In other embodiments, one or more candidate source request actions may be generated based on the comparison or evaluation.

In one or more of the various embodiments, the selection, generation, or composition of one or more candidate source request actions may be based on one or more machine learning models, linear regression models, heuristics models, or others derived from relevant historical metrics associated with one or more other campaigns. In some embodiments, such information may include information associated with similar demographics information or one or more other characteristics that correspond to one or more characteristics of the campaign. In some embodiments, the one or more machine learning models, linear regression models, heuristics models, or others, such as one or more models employed by prediction engine 420, may be employed to discover one or more actions or campaign modifications that are predicted to lead to the one or more sources to contribute resources, to increase a quantity of resource contributions, to increase a magnitude of contributed resources, or others, at least in comparison to one or more other candidate source request actions. In some embodiments, one or more scores or weighting values may be assigned to one or more actions or campaign modifications based on the discoveries. For example, in some embodiments, one or more discovered actions may be associated with a score that may be derived from a confidence indicator (e.g., correlation coefficient, or others) provided by the machine learning system that was used to discover the one or more actions. For example, in some embodiments, a deep-learning artificial neural network may be trained using historical information to classify or identify one or more features of candidate source request actions that are predicted to have increased success rates (e.g., increased magnitude in contributed resources, increased quantity in resource contributions, or others), such as one or more networks employed by prediction engine 420.

At decision block 1108, in one or more of the various embodiments, if a relevant difference is produced or discovered, control may flow to block 1110; otherwise, control may return to a calling process. In one or more of the various embodiments, one or more scores assigned to one or more presently applied source request actions may be compared to one or more scores assigned to the one or more candidate source request actions. In some of the various embodiments, a relevant difference may be defined by one or more scores assigned to one or more candidate source request actions exceeding the presently applied source request actions by one or more predetermined amounts. In some embodiments, the comparison is based on aggregated scores (e.g., summed, averaged, or others). In other embodiments, the comparison is applied to the one or more scores individually with the results being weighted. In some embodiments, one or more machine learning models, linear regression models, heuristics models, or others, such as one or more models employed by prediction engine 420, may be applied to scores derived from the evaluations to discover that one or more of the evaluations provide one or more scores that are better predictors than one or more scores of one or more other evaluations. For example, the discoveries may indicate that the one or more scores assigned at block 1104 are better predictors of magnitude of contributed resources than the one or more scores assigned at one or more of block 1102 or block 1106 individually, yet a worse predictor of magnitude of contributed resources than the one or more scores assigned at one or more of block 1102 or block 1106 when one or more of the one or more scores assigned at one or more of block 1102 or block 1106 exceed the one or more scores assigned to the presently applied source request action by a particular amount. Accordingly, in this example, the weights may be dynamically applied based on one or more thresholds being exceeded, as determined by the discoveries. In some embodiments, the one or more candidate source request actions with the greatest one or more scores may be selected as the one or more most valuable source request actions.

At block 1110, in one or more of the various embodiments, one or more source request actions may be modified. In some of the various embodiments, the one or more presently applied source request actions may be modified to shift closer to the one or more most relevant source request actions (e.g., averaging or others) based on the discoveries. In other embodiments, the one or more presently applied source request actions may be canceled, and the one or more most relevant source request actions may be applied instead. In some embodiments, modifying the source request action may include providing one or more system components, resource collection requests, or others to the one or more sources with particular layouts, interface components, (e.g., one or more check boxes, radio buttons, text fields, or others), content, timing, quantities, or others based on the one or more applied source request actions. For example, when retargeting the one or more sources, the one or more resource collection requests may be provided when an actual or derived location of the one or more sources has cloudy, cold, or rainy weather based on the obtained metrics including location information (e.g., provided by the one or more sources, derived from GPS information, derived from IP address information, or others) associated with the one or more sources, correlating the location information with weather information, and the evaluation of the metrics indicating that the one or more sources are predicted to provide a larger magnitude of resources in cloudy, cold, or rainy weather than sunny weather (e.g., fewer outdoor activities may be available to sources in cloudy, cold, or rainy weather), such as based on one or more predictions discovered by prediction engine 420. In some embodiments, language, grammar, included information, images, or other content may be modified based on the one or more most relevant source request actions.

In some embodiments, process 1100 may continue operating until the campaign ends or a user configures process 1100 to terminate operation. Next, control may be returned to a calling process.

Figure 12:
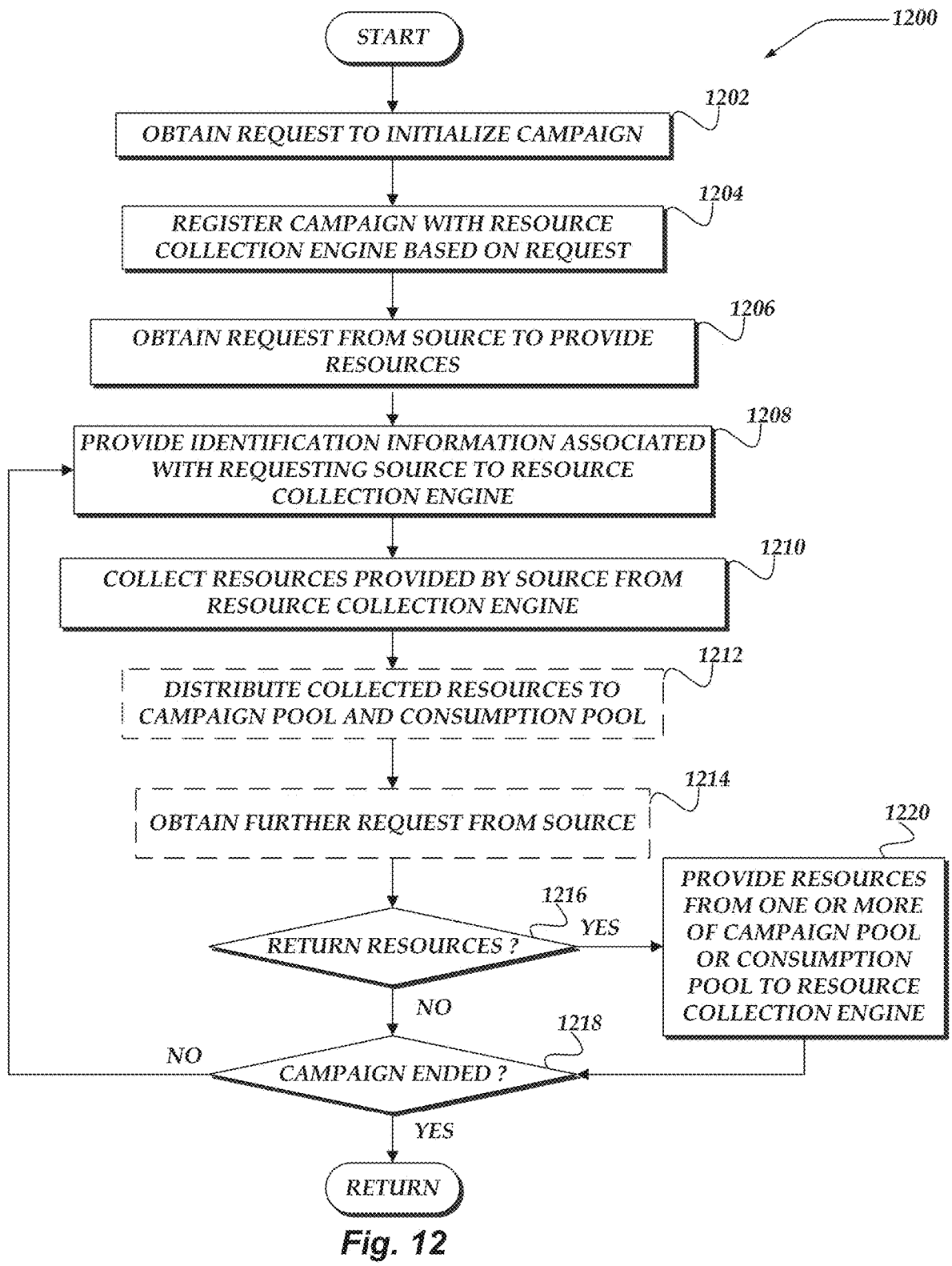
FIG. 12 shows a logical flowchart of an example process for collecting resources.

FIG. 12 shows a logical flow diagram of example process 1200 for collecting resources. One or more portions of process 1200 may be performed by one or more client computers or network computers (for example, client computer 200, network computer 300, or others), such as client or network computers included in or associated with one or more of campaign agents 402, campaign owners 404, campaign monitors 406, sources 408, campaign management computer 410, or others. In one or more of the various embodiments, after a start block, at block 1202, a request to initialize a campaign may be obtained, such as a campaign to collect resources. In some of the various embodiments, a campaign owner may communicate the request over one or more networks to the one or more campaign management computers. In some embodiments, the request may be provided via a user interface (e.g., a web page, application, or others) in various forms, such as email, user interface (UI) notification, instant message, or others.

At block 1204, in one or more of the various embodiments, the campaign may be registered with one or more resource collection engines (e.g., resource collection engine 324 or others). In some of the various embodiments, the one or more resource collection engines may be operated by one or more third parties (e.g., WEPAY, STRIPE, escrow services, or others). In some embodiments, registering the campaign with the one or more resource collection engines may include opening one or more accounts with the one or more resource collection engines and associating the one or more accounts with the campaign.

In one or more of the various embodiments, one or more of the resource collection engines may be part of the campaign management system rather than being an external service or third-party services. Likewise, one or more services or features of the resource collection engines may be performed by the campaign management system with the remainder of the services or features of the resource collection engines being performed by an external or third-party service.

At block 1206, in one or more of the various embodiments, one or more requests to provide resources may be obtained from one or more sources. In some embodiments, the one or more requests may automatically identify one or more campaign agents to attribute metrics associated with the resources based on one or more provided requests from the one or more campaign agents. In other embodiments, the one or more sources may input identification information associated with one or more campaign agents to attribute metrics associated with the resources based on one or more interactions with one or more system components (e.g., one or more web pages, applications, or others) associated with the campaign, campaign management computer, or others (e.g., drop-down list, checkboxes, text fields, or others). In some of the various embodiments, the one or more sources may communicate the one or more requests over one or more networks to the one or more resource collection engines. In some embodiments, the one or more requests may be provided via one or more system components (e.g., one or more web pages, applications, or others) associated with the campaign, campaign management computer, or others.

At block 1208, in one or more of the various embodiments, identification information (e.g., one or more substation facility identifiers, security information to access electrical grid, names, addresses, phone numbers, email addresses, social security numbers, credit card numbers, or others) associated with the one or more requesting sources may be provided to the one or more resource collection engines. In some of the various embodiments, the one or more sources may input the identification information in the one or more system components, which may include one or more application program interfaces (APIs) that communicate the identification information over one or more networks to the one or more resource collection engines. In some embodiments, one or more collection identifiers may be generated each time the one or more system components are initialized, and the one or more collection identifiers may be included with the one or more communications to the one or more resource collection engines to prevent duplicate resource collections. For example, the one or more system components may submit a communication to the one or more resource collection engines multiple times because the submission seems to have failed, and, if the one or more resource collection engines obtains the multiple submissions, the one or more resource collection engines may recognize that one or more of the submissions are duplicates based on the multiple submissions having the same one or more identifiers. In some embodiments, the one or more resource collection engines may collect (e.g., logically collect, physically collect, or others) the resources from the one or more sources and may store the collected resources in one or more storage spaces (e.g., one or more batteries, tanks, ledgers, or others).

In some of the various embodiments, when one or more campaign components (e.g., one or more campaign owners, campaign agents, campaign monitors, sources, or others) are offline from one or more networks, one or more sending, forwarding, or other campaign components in the campaign management system (e.g., one or more campaign management computers 410, campaign monitors 406, campaign owners 404, campaign agents 402, or others) may cache one or more portions of one or more communications intended for the one or more offline campaign components. In one or more of the various embodiments, the one or more sending, forwarding, or other campaign components may detect that the one or more offline components went offline based on one or more of losing one or more connections to one or more applications, engines, or others in the one or more offline components, failing to obtain a response to one or more communications (e.g., one or more ACK communications or others), or others. In some of the various embodiments, when the one or more campaign components come back online, the one or more rejoining components may notify one or more other campaign components. In some embodiments, the one or more sending, forwarding, or other campaign components may detect the return of the one or more rejoining components based on one or more notifications, reconnections to one or more engines in the one or more rejoining components, responses to one or more prior communications to the one or more rejoining components, or others.

In one or more of the various embodiments, when the one or more campaign components come back online, the one or more sending, forwarding, or other campaign components in the campaign management system (e.g., system 400) may resynchronize the one or more rejoining campaign components in a synching process. In some of the various embodiments, the synching process may include auditing information in the one or more rejoining components to evaluate one or more states of the one or more rejoining components, whether one or more portions of information in the one or more rejoining components is up to date, or others. In some embodiments, the audit may include obtaining a timestamp associated with a most-recent update of the one or more rejoining components. In some embodiments, the synching process may include evaluating the audited information to produce one or more results that indicate whether one or more states, information, or others in the one or more rejoining components are out of date. In some embodiments, the evaluation may include comparing the timestamp to one or more timestamps associated with a most-recent update provided to one or more other campaign components. In some embodiments, the synching process may include updating information in the one or more rejoining components to reflect updated information associated with the campaign, such as state information associated with the campaign (e.g., the campaign is being initialized, has launched, has concluded, or others) or others.

In one or more of the various embodiments, the campaign management system may improve communication reliability or coverage by employing one or more failovers. In some of the various embodiments, the one or more failovers may include multiple communication providers that may be dynamically employed based on availability of the one or more other communication providers, such as multiple email providers (e.g., SENDRID, MANDRIL, or others), multiple payment platforms (e.g., WEPAY, STRIPE, or others), or others. In some embodiments, the one or more failovers may include multiple communication modalities that may be dynamically employed based on availability of the one or more other communication modalities, such as two or more of email, SMS (e.g., SMS provided by TOYO or others), user interface (UI) notification, instant message, or others. In some embodiments, one or more configuration files, rules, custom scripts, or others may execute logic (e.g., confirming that no ACK communications were received or others) to prevent duplicate actions when switching providers, modes, or others. In some embodiments, one or more pools of providers or modalities may be provided, and a provider or modality may be selected from the one or more pools based on one or more input conditions, on a rotating basis, or others. Accordingly, system 400 facilitates conducting campaigns over wide geographic regions with varying levels of network reliability or coverage by facilitating employing multi-modal networks and dynamically changing modes of communication from one mode to another based on availability of the communication modes. For example, a campaign monitor may attempt to send a communication to a campaign owner through a campaign monitor engine (e.g., campaign monitor engine 222), and the campaign monitor engine may dynamically select one or more modes of communication, one or more providers, or others based on network availability associated with the one or more modes of communication, one or more providers, or others. In some embodiments, the campaign monitor engine may provide one or more notifications (e.g., a UI notification or others) that the campaign monitor engine is attempting to dynamically select a different mode of communication, provider, or others. In other embodiments, the campaign monitor engine may dynamically select the different mode of communication, provider, or others without further notification.

At block 1210, in one or more of the various embodiments, the resources from the one or more sources may be collected (e.g., logically collected, physically collected, or others) from the one or more resource collection engines. In some of the various embodiments, the one or more resource collection engines may provide one or more tokens that indicate that the resources have been collected from the source, and the campaign management computer may treat the resources as having been logically collected. In other embodiments, the one or more resource collection engines may provide the resources to one or more storage spaces (e.g., one or more batteries, tanks, ledgers, or others) associated with the campaign management computer.

At block 1212, in one or more of the various embodiments, optionally, the collected resources may be distributed (e.g., logically distributed, physically distributed, or others) to one or more pools, such as one or more campaign pools, consumption pools, or others. In some of the various embodiments, the collected resources may be distributed based on one or more obtained metrics, such as consumption information associated with one or more portions of the collected resources that may be consumed during the campaign (e.g., inefficiencies, storage costs, expenses, one or more rewards to one or more campaign monitors, one or more rewards to one or more campaign agents, one or more rewards to one or more campaign owners, or others). In some embodiments, when the resources are collected from the one or more resource collection engines during or throughout the campaign, the collected resources may be distributed in the pools based on estimated consumption information, such as by distributing an amount of the collected resources that meets or exceeds the magnitude of consumed resources represented by the estimated consumption information in the one or more consumption pools and distributing the remaining collected resources in the one or more campaign pools. In some embodiments, one or more campaign owners, agents, monitors, sources, or others may be enabled to examine or review the collected resources in the one or more campaign pools. Block 1212 is optional because, in some embodiments, the collected resources remaining may be placed in the one or more campaign pools, may be distributed in the pools when the campaign ends, or others.

In one or more of the various embodiments, a campaign manage system may be arranged to provide predicted consumptions amounts while the campaign may be ongoing, such as based on one or more predictions discovered by prediction engine 420. In one or more of the various embodiments, the estimated or predicted values of the one or more predicted consumption amounts may be based on one or more machine learning models, linear regression models, heuristics models, or others, such as one or more models employed by prediction engine 420, derived from relevant historical metrics for one or more other campaigns. In some embodiments, such information may include information associated with one or more other campaign owners, entities, campaign agents, campaign monitors, geographical or logical territories, sources, others having similar demographics information, or others having one or more characteristics that correspond to one or more characteristics of the campaign, campaign owner, entity, one or more campaign agents, campaign monitor, campaign management computer, geographical or logical territory, or others. In some embodiments, the one or more machine learning models, linear regression models, heuristics models, or others may be employed to discover one or more predicted amounts of resource consumption by the campaign. In other embodiments, one or more machine learning models, linear regression models, heuristics models, or others may be applied to historical metrics for one or more other campaigns associated with one or more data objects of one or more of the campaign owner, entity, one or more campaign agents, campaign monitor, campaign management computer, one or more sources, or others to provide one or more portions of the discoveries. In some embodiments, the discovered predicted consumption amounts may be aggregated (e.g., averaged or others) to provide a predicted consumption amount. In other embodiments, the largest discovered predicted consumption amount may be employed as the predicted consumption amount. In some embodiments, the collected resources may be distributed in the pools on a pro rata basis in proportion to the percent of the campaign that has been completed (e.g., percent of time, resources collected, or others) based on the predicted consumption amount. In other embodiments, the collected resources may be distributed in the consumption pool until the predicted consumption amount is met or exceeded and subsequently distributing the remaining collected resources in the campaign pool. Also, in one or more of the various embodiments, one or more buffer values may be defined to withhold a portion of the resources until the end of the campaign.

At block 1214, in one or more of the various embodiments, optionally, one or more further requests may be obtained from the one or more sources. In some embodiments, the one or more further requests may include one or more requests to contribute further resources, for contributed resources to be returned to the one or more sources, or others. Block 1214 is optional because, in some embodiments, the collected resources may be collected only once, may not be returned, zero further requests may be obtained, or others.

At decision block 1216, in one or more of the various embodiments, if the one or more further requests are to return resources, control may proceed to block 1220; otherwise, control may proceed to decision block 1218.

At decision block 1218, in one or more of the various embodiments, if the campaign has ended, control may return to a calling process; otherwise, control may return to block 1208 to handle the one or more further requests. In some embodiments, the one or more further requests may be handled by control returning to block 1208 one more time after the campaign ends. In some embodiments, a campaign may end based on the occurrence of one or more conditions, such as meeting or exceeding one or more goals associated with the campaign, expiration of a defined duration of the campaign, arbitrary feedback from one or more campaign owners or monitors, exhausting one or more sources, each campaign agent or owner ceasing to participate in the campaign, or others.

At block 1220, in one or more of the various embodiments, resources from one or more of the one or more campaign pools, consumption pools, or others may be provided to the resource collection engine for return to the one or more sources. In other embodiments, the resource collection engine may be bypassed when providing the resources back to the one or more sources. In some of the various embodiments, return resources may be provided from the one or more campaign pools until the one or more campaign pools is depleted and then may be provided from the consumption pool. In one or more of the various embodiments, the campaign management system may be arranged to communicate the resource return requests to one or more resource collection engines. Accordingly, in some embodiments, the one or more resource collection engines may then return the applicable resources directly to the requesting source.

In some embodiments, process 1200 may continue operating until the campaign ends or a user configures process 1200 to terminate operation. Next, control may be returned to a calling process.

Figure 13:
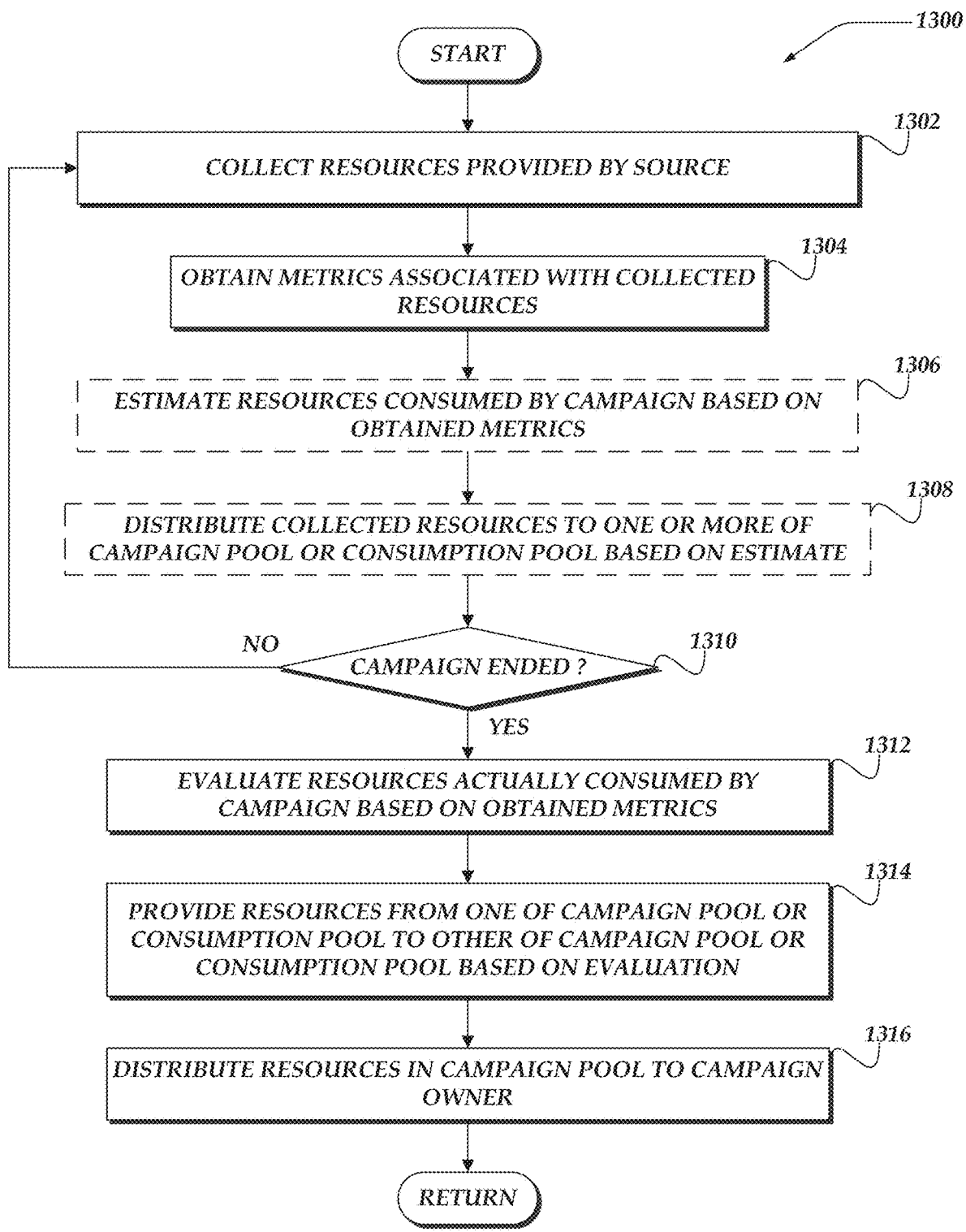
FIG. 13 illustrates a logical flow diagram of an example process for distributing resources.

FIG. 13 illustrates a logical flowchart of example process 1300 for distributing resources. One or more portions of process 1300 may be performed by one or more client computers or network computers (for example, client computer 200, network computer 300, or others), such as client or network computers included in or associated with one or more of campaign agents 402, campaign owners 404, campaign monitors 406, sources 408, campaign management computer 410, or others. In one or more of the various embodiments, after a start block, at block 1302, resources provided by one or more sources may be collected. In some of the various embodiments, the resources may be collected as described in one or more of blocks 1204-1210 or others.

At block 1304, one or more metrics associated with the collected resources may be obtained. In some of the various embodiments, the one or more metrics may be obtained based on one or more sensor readings (e.g., one or more voltage sensors, current sensors, volume sensors, flow sensors, heat sensors, or others), tracking one or more rewards earned by one or more campaign monitors, tracking one or more rewards earned by one or more campaign agents, tracking one or more rewards earned by one or more campaign owners, or others.

At block 1306, in one or more of the various embodiments, optionally, resources consumed by the campaign may be estimated based on the obtained metrics. In some of the various embodiments, the resources consumed by the campaign may be estimated as described in block 1212 or others. Block 1306 is optional because, in some embodiments, collected resources may not be distributed until the campaign concludes, collected resources may be distributed to one or more consumption pools until the campaign concludes, or others.

At block 1308, in one or more of the various embodiments, optionally, collected resources may be distributed to one or more campaign pools or the one or more consumption pools based on the estimate. In some of the various embodiments, the collected resources may be distributed as described in block 1212 or others. Block 1308 is optional because, in some embodiments, collected resources may not be distributed until the campaign concludes, collected resources may be distributed to one or more consumption pools until the campaign concludes, or others.

At decision block 1310, in one or more of the various embodiments, if the campaign has ended, control may flow to block 1312; otherwise, control may loop back to block 1302. In some of the various embodiments, a campaign may end based on the occurrence of one or more conditions, such as meeting or exceeding one or more goals associated with the campaign, expiration of a defined duration of the campaign, arbitrary feedback from one or more campaign owners or monitors, exhausting one or more sources, each campaign agent or owner ceasing to participate in the campaign, or others.

At block 1312, in one or more of the various embodiments, one or more resources actually consumed by the campaign may be evaluated based on the obtained metrics. In some of the various embodiments, the rewards to be distributed (e.g., rewards to one or more campaign agents, campaign owners, campaign monitors, or others) may be aggregated along with other values associated with resource consumption, such as one or more other expenses or others.

At block 1314, in one or more of the various embodiments, resources from one of the one or more campaign pools or consumption pools may be provided to the other of the one or more campaign pools or consumption pools based on the evaluation. In some of the various embodiments, if the aggregated resource consumption exceeds the amount of resources in the one or more consumption pools, a portion of the resources in the one or more campaign pools that corresponds to the excess amount of resource consumption may be provided to the one or more consumption pools. In some embodiments, if the aggregated resource consumption is exceeded by the amount of resources in the one or more consumption pools, a portion of the resources in the one or more consumption pools that corresponds to the excess amount in the one or more resource consumption pools may be provided to the one or more campaign pools.

At block 1316, in one or more of the various embodiments, the resources in the one or more campaign pools may be distributed (e.g., logically distributed, physically distributed, or others) to the one or more campaign owners. In some of the various embodiments, the resources may be distributed to the one or more campaign owners during or throughout the campaign based on the estimated resource consumption. In some embodiments, if the estimates were less than the actual resource consumption amounts, the excess consumed resources may be collected from the one or more campaign owners.

In one or more of the various embodiments, the campaign management system may be arranged to automatically liquidate one or more physical resources and provide the proceeds to the campaign owners. In other embodiments, the campaign management system may be arranged to provide one or more vouchers that the campaign owner may redeem for other resources or services. Further, in some cases, the campaign management system may be arranged to compute the value of the resources and electronically deposit assets of the computed value in a location or account of the campaign owner's choosing.

In some embodiments, process 1300 may continue operating until the campaign ends, the collected resources have been fully distributed or consumed, or a user configures process 1300 to terminate operation. Next, control may be returned to a calling process.

It will be understood that each block of the flowchart illustration, and combinations of blocks in the flowchart illustration, can be implemented by computer program instructions. These program instructions may be provided to one or more processors to produce a machine, such that the instructions, which execute on the one or more processors, create means for implementing the actions specified in the flowchart block or blocks. The computer program instructions may be executed by the one or more processors to cause a series of operational steps to be performed by the one or more processors to produce a computer-implemented process such that the instructions, which execute on the one or more processors to provide steps for implementing the actions specified in the flowchart block or blocks. The computer program instructions may also cause at least some of the operational steps shown in the blocks of the flowchart to be performed in parallel or concurrently by the one or more processors or one or more computers. Moreover, some of the steps may also be performed across more than one processor or computer. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an embodiment of at least one of the various embodiments of the invention.

Further, in one or more embodiments (not shown in the figures), the logic in the illustrative flowcharts may be executed using one or more embedded logic hardware devices instead of one or more CPUs, such as an Application Specific Integrated Circuits (ASICs), Field Programmable Gate Arrays (FPGAs), Programmable Array Logic chips (PALs), or others. The embedded one or more logic hardware devices may directly execute their embedded logic to perform actions. In at least one embodiment, one or more microcontrollers may be arranged as system-on-a-chip (SOCs) to directly execute their own locally embedded logic to perform actions and access their own internal memory and their own external Input and Output Interfaces (e.g., hardware pins or wireless transceivers) to perform actions described herein.

What is claimed as new and desired to be protected by Letters Patent of the United States is:

1. A method for executing one or more campaigns, wherein one or more processors in a network computer execute instructions to perform actions, comprising:
    employing a campaign management engine to perform actions including:
        providing one or more initialization identifiers to one or more campaign agents that are associated with one or more campaign owners;
        associating the one or more campaign agents with one or more campaigns based on the one or more initialization identifiers;
        obtaining source information from the one or more campaign agents;
        evaluating the source information based on one or more defined rules or patterns;
        evaluating one or more portions of the source information that corresponds to a previously identified source associated with one or more other campaigns;
        discarding one or more portions of the source information based on one or more results of the evaluations;
        obtaining additional source information to replace some or all of the one or more discarded portions of the source information from the one or more campaign agents;
        communicating resource collection requests to a plurality of sources based on the source information, the source information discretely identifying respective sources in the plurality of sources;
        providing one or more metrics based on monitoring of one or more actions of the plurality of sources;
        employing a metric analysis engine to identify one or more outlier characteristics associated with one or more of the resource collection requests based on a comparison of the one or more metrics to one or more other campaigns; and
        modifying the resource collection requests to provide one or more communications based on one or more predicted metrics that are associated with the one or more outlier characteristics, wherein the one or more predicted metrics are provided by a prediction engine, and wherein the one or more communications are provided to one or more sources in the plurality of sources associated with the one or more outlier characteristics;
    detecting that one or more of the one or more campaign agents, the one or more campaign owners, or at least one source in the plurality of sources are offline based on a loss of one or more network connections;
    caching one or more portions of one or more communications intended for the one or more of the one or more campaign agents, the one or more campaign owners, or the at least one source that are associated with the loss of the one or more network connections;
    providing the one or more portions of the one or more communications to the one or more of the one or more campaign agents, the one or more campaign owners, or the at least one source based on one or more of a restoration of the one or more lost network connections or an establishment of one or more other network connections; and
    employing a resource distribution engine to distribute resources provided from the plurality of sources to the one or more campaign owners.

2. The method of claim 1, further comprising:
    providing one or more incentive resources that are associated with the one or more campaigns and one or more of the one or more metrics;
    obtaining one or more incentive resource selections from the one or more campaign agents that are associated with one or more threshold values that correspond to the one or more of the one or more metrics; and
    providing the one or more incentive resources to the one or more campaign agents based on one or more of the one or more threshold values being met or exceeded.

3. The method of claim 1, wherein monitoring of the one or more actions of the plurality of sources comprises collecting one or more interaction metrics that measure one or more interactions of the plurality of sources with instruction information included in the resource collection requests, and modifying the resource collection requests comprises canceling one or more source request actions.

4. The method of claim 1, wherein communicating the resource collection requests to the plurality of sources comprises:
    associating one of the resource collection requests with one of the one or more campaign agents; and
    including information in the one of resource collection requests that identifies the one of the one or more campaign agents, wherein the included information comprises one or more of an email address, name, photograph, or telephone number.

5. The method of claim 1, wherein providing the one or more initialization identifiers comprises:
generating one or more data objects that include the one or more initialization identifiers; and
providing the one or more data objects to one or more campaign monitors assigned to the one or more campaigns for distribution to the one or more campaign agents.

6. The method of claim 1, further comprising:
providing access to one or more user-interface components to the plurality of sources, wherein the one or more user-interface components are associated with the resource collection requests; and
displaying a recommended resource contribution magnitude based on the one or more metrics and the one or more predicted metrics.

7. The method of claim 1, wherein associating the one or more campaign agents with the one or more campaigns comprises providing sequential access to one or more user-interface components to the one or more campaign agents, wherein one or more of the one or more campaign agents are prevented from accessing one or more of the one or more user-interface components until one or more other ones of the one or more campaign agents complete one or more actions associated with one or more other ones of the one or more user-interface components.

8. A system for executing one or more campaigns, comprising:
a network computer, comprising:
one or more transceivers that communicates over a network;
memory that stores at least instructions; and
one or more processors that execute instructions associated with the network computer that cause the one or more processors of the network computer to perform actions, comprising:
employing a campaign management engine to perform actions including:
providing one or more initialization identifiers to one or more campaign agents that are associated with one or more campaign owners;
associating the one or more campaign agents with one or more campaigns based on the one or more initialization identifiers;
obtaining source information from the one or more campaign agents;
evaluating the source information based on one or more defined rules or patterns;
evaluating one or more portions of the source information that corresponds to a previously identified source associated with one or more other campaigns;
discarding one or more portions of the source information based on one or more results of the evaluations;
obtaining additional source information to replace some or all of the one or more discarded portions of the source information from the one or more campaign agents;
communicating resource collection requests to a plurality of sources based on the source information, the source information discretely identifying respective sources in the plurality of sources;
providing one or more metrics based on monitoring of one or more actions of the plurality of sources;
employing a metric analysis engine to identify one or more outlier characteristics associated with one or more of the resource collection requests based on a comparison of the one or more metrics to one or more other campaigns; and
modifying the resource collection requests to provide one or more communications based on one or more predicted metrics that are associated with the one or more outlier characteristics, wherein the one or more predicted metrics are provided by a prediction engine, and wherein the one or more communications are provided to one or more sources in the plurality of sources associated with the one or more outlier characteristics;
detecting that one or more of the one or more campaign agents, the one or more campaign owners, or at least one source in the plurality of sources are offline based on a loss of one or more network connections;
caching one or more portions of one or more communications intended for the one or more of the one or more campaign agents, the one or more campaign owners, or the at least one source that are associated with the loss of the one or more network connections;
providing the one or more portions of the one or more communications to the one or more of the one or more campaign agents, the one or more campaign owners, or the at least one source based on one or more of a restoration of the one or more lost network connections or an establishment of one or more other network connections; and
employing a resource distribution engine to distribute resources provided from the plurality of sources to the one or more campaign owners; and
a client computer, comprising:
one or more transceivers that communicate over the network;
memory that stores at least instructions; and
one or more processors that execute instructions associated with the client computer that cause the one or more processors of the client computer to perform actions, comprising:
providing one or more portions of the source information.

9. The system of claim 8, wherein the instructions associated with the network computer cause the one or more processors of the network computer to perform further actions, comprising:
providing one or more incentive resources that are associated with the one or more campaigns and one or more of the one or more metrics;
obtaining one or more incentive resource selections from the one or more campaign agents that are associated with one or more threshold values that correspond to the one or more of the one or more metrics; and
providing the one or more incentive resources to the one or more campaign agents based on one or more of the one or more threshold values being met or exceeded.

10. The system of claim 8, wherein monitoring of the one or more actions of the plurality of sources comprises collecting one or more interaction metrics that measure one or more interactions of the plurality of sources with instruction information included in the resource collection requests, and modifying the resource collection requests comprises canceling one or more source request actions.

11. The system of claim 8, wherein communicating the one or more resource collection requests to the plurality of sources comprises:
  associating one of the resource collection requests with one of the one or more campaign agents; and
  including information in the one of resource collection requests that identifies the one of the one or more campaign agents, wherein the included information comprises one or more of an email address, name, photograph, or telephone number.

12. The system of claim 8, wherein providing the one or more initialization identifiers comprises:
  generating one or more data objects that include the one or more initialization identifiers; and
  providing the one or more data objects to one or more campaign monitors assigned to the one or more campaigns for distribution to the one or more campaign agents.

13. The system of claim 8, wherein the instructions associated with the network computer cause the one or more processors of the network computer to perform further actions, comprising:
  providing access to one or more user-interface components to the plurality of sources, wherein the one or more user-interface components are associated with the one or more resource collection requests; and
  displaying a recommended resource contribution magnitude based on the one or more metrics and the one or more predicted metrics.

14. A processor readable non-transitory storage media that includes instructions for executing one or more campaigns, wherein execution of the instructions by one or more processors performs actions, comprising:
  employing a campaign management engine to perform actions including:
    providing one or more initialization identifiers to one or more campaign agents that are associated with one or more campaign owners;
    associating the one or more campaign agents with one or more campaigns based on the one or more initialization identifiers;
    obtaining source information from the one or more campaign agents;
    evaluating the source information based on one or more defined rules or patterns;
    evaluating one or more portions of the source information that corresponds to a previously identified source associated with one or more other campaigns;
    discarding one or more portions of the source information based on one or more results of the evaluations;
    obtaining additional source information to replace some or all of the one or more discarded portions of the source information from the one or more campaign agents;
    communicating resource collection requests to a plurality of sources based on the source information, the source information discretely identifying respective sources in the plurality of sources;
    providing one or more metrics based on monitoring of one or more actions of the plurality of sources;
    employing a metric analysis engine to identify one or more outlier characteristics associated with one or more of the resource collection requests based on a comparison of the one or more metrics to one or more other campaigns; and
    modifying the resource collection requests to provide one or more communications based on one or more predicted metrics that are associated with the one or more outlier characteristics, wherein the one or more predicted metrics are provided by a prediction engine, and wherein the one or more communications are provided to one or more sources in the plurality of sources associated with the one or more outlier characteristics;
  detecting that one or more of the one or more campaign agents, the one or more campaign owners, or at least one source in the plurality of sources are offline based on a loss of one or more network connections;
  caching one or more portions of one or more communications intended for the one or more of the one or more campaign agents, the one or more campaign owners, or the at least one source that are associated with the loss of the one or more network connections;
  providing the one or more portions of the one or more communications to the one or more of the one or more campaign agents, the one or more campaign owners, or the at least one source based on one or more of a restoration of the one or more lost network connections or an establishment of one or more other network connections; and
  employing a resource distribution engine to distribute resources provided from the plurality of sources to the one or more campaign owners.

15. The media of claim 14, wherein execution of the instructions by the one or more processors performs further actions, comprising:
  providing one or more incentive resources that are associated with the one or more campaigns and one or more of the one or more metrics;
  obtaining one or more incentive resource selections from the one or more campaign agents that are associated with one or more threshold values that correspond to the one or more of the one or more metrics; and
  providing the one or more incentive resources to the one or more campaign agents based on one or more of the one or more threshold values being met or exceeded.

16. The media of claim 14, wherein monitoring of the one or more actions of the plurality of sources comprises collecting one or more interaction metrics that measure one or more interactions of the plurality of sources with instruction information included in the resource collection requests, and modifying the resource collection requests comprises canceling one or more source request actions.

17. The media of claim 14, wherein communicating the resource collection requests to the plurality of sources comprises:
  associating one of the resource collection requests with one of the one or more campaign agents; and
  including information in the one of resource collection requests that identifies the one of the one or more campaign agents, wherein the included information comprises one or more of an email address, name, photograph, or telephone number.

18. The media of claim 14, wherein providing the one or more initialization identifiers comprises:
  generating one or more data objects that include the one or more initialization identifiers; and
  providing the one or more data objects to one or more campaign monitors assigned to the one or more campaigns for distribution to the one or more campaign agents.

19. The media of claim 14, wherein execution of the instructions by the one or more processors performs further actions, comprising:

providing access to one or more user-interface components to the plurality of sources, wherein the one or more user-interface components are associated with the resource collection requests; and displaying a recommended resource contribution magnitude based on the one or more metrics and the one or more predicted metrics.

20. A network computer for executing one or more campaigns, comprising:

one or more transceivers that communicate over a network;

memory that stores at least instructions; and one or more processors that execute instructions that cause the one or more processors to perform actions, including:

employing a campaign management engine to perform actions including:

providing one or more initialization identifiers to one or more campaign agents that are associated with one or more campaign owners;

associating the one or more campaign agents with one or more campaigns based on the one or more initialization identifiers;

obtaining source information from the one or more campaign agents;

evaluating the source information based on one or more defined rules or patterns;

evaluating one or more portions of the source information that corresponds to a previously identified source associated with one or more other campaigns;

discarding one or more portions of the source information based on one or more results of the evaluations;

obtaining additional source information to replace some or all of the one or more discarded portions of the source information from the one or more campaign agents;

communicating resource collection requests to a plurality of sources based on the source information, the source information discretely identifying respective sources in the plurality of sources;

providing one or more metrics based on monitoring of one or more actions of the plurality of sources;

employing a metric analysis engine to identify one or more outlier characteristics associated with one or more of the resource collection requests based on a comparison of the one or more metrics to one or more other campaigns; and modifying the resource collection requests to provide one or more communications based on one or more predicted metrics that are associated with the one or more outlier characteristics, wherein the one or more predicted metrics are provided by a prediction engine, and wherein the one or more communications are provided to one or more sources in the plurality of sources associated with the one or more outlier characteristics;

detecting that one or more of the one or more campaign agents, the one or more campaign owners, or at least one source in the plurality of sources are offline based on a loss of one or more network connections;

caching one or more portions of one or more communications intended for the one or more of the one or more campaign agents, the one or more campaign owners, or the at least one source that are associated with the loss of the one or more network connections;

providing the one or more portions of the one or more communications to the one or more of the one or more campaign agents, the one or more campaign owners, or the at least one source based on one or more of a restoration of the one or more lost network connections or an establishment of one or more other network connections; and employing a resource distribution engine to distribute resources provided from the plurality of sources to the one or more campaign owners.

21. The network computer of claim 20, wherein the instructions cause the one or more processors to perform further actions, comprising:

providing one or more incentive resources that are associated with the one or more campaigns and one or more of the one or more metrics;

obtaining one or more incentive resource selections from the one or more campaign agents that are associated with one or more threshold values that correspond to the one or more of the one or more metrics; and providing the one or more incentive resources to the one or more campaign agents based on one or more of the one or more threshold values being met or exceeded.

22. The network computer of claim 20, wherein monitoring of the one or more actions of the plurality of sources comprises collecting one or more interaction metrics that measure one or more interactions of the plurality of sources with instruction information included in the resource collection requests, and modifying the resource collection requests comprises canceling one or more source request actions.

23. The network computer of claim 20, wherein communicating the resource collection requests to the plurality of sources comprises:

associating one of the resource collection requests with one of the one or more campaign agents; and including information in the one of resource collection requests that identifies the one of the one or more campaign agents, wherein the included information comprises one or more of an email address, name, photograph, or telephone number.

24. The network computer of claim 20, wherein providing the one or more initialization identifiers comprises:

generating one or more data objects that include the one or more initialization identifiers; and providing the one or more data objects to one or more campaign monitors assigned to the one or more campaigns for distribution to the one or more campaign agents.

25. The network computer of claim 20, wherein the instructions cause the one or more processors to perform further actions, comprising:

providing access to one or more user-interface components to the plurality of sources, wherein the one or more user-interface components are associated with the resource collection requests; and displaying a recommended resource contribution magnitude based on the one or more metrics and the one or more predicted metrics.

26. The network computer of claim 20, wherein associating the one or more campaign agents with the one or more campaigns comprises providing sequential access to one or more user-interface components to the one or more campaign agents, wherein one or more of the one or more campaign agents are prevented from accessing one or more of the one or more user-interface components until one or more other ones of the one or more campaign agents complete one or more actions associated with one or more other ones of the one or more user-interface components.

27. The network computer of claim 20, wherein providing one or more initialization identifiers to one or more campaign agents comprises providing the one or more initialization identifiers to a plurality of human campaign agents that are associated with the one or more campaign owners or to a plurality of client computers that are each associated with a respective one of the human campaign agents.

28. The network computer of claim 20, wherein communicating resource collection requests comprises communicating the resource collection requests via a medium to the plurality of resources, and the one or more communications are provided via the medium to the one or more sources in the plurality of sources associated with the outlier characteristics.

29. The network computer of claim 20, wherein providing one or more initialization identifiers to one or more campaign agents comprises providing the one or more initialization identifiers to a plurality of human campaign agents that are associated with the one or more campaign owners or to a plurality of client computers that are each associated with a respective one of the human campaign agents.

* * * * *